United States Patent
Eom et al.

(10) Patent No.: US 12,430,483 B2
(45) Date of Patent: Sep. 30, 2025

(54) APPLICATION OF BOUNDARY CONDITIONS ON VOXELIZED MESHES IN COMPUTER AIDED GENERATIVE DESIGN

(71) Applicant: Autodesk, Inc., San Francisco, CA (US)

(72) Inventors: Jaesung Eom, Wexford, PA (US); Jesus Rodriguez, Farmington, MI (US); David Jon Weinberg, Gig Harbor, WA (US); Siavash Navadeh Meshkat, Carlsbad, CA (US); Jonas Dalidd, Santa Barbara, CA (US); Ravi Kumar Burla, Novi, MI (US)

(73) Assignee: Autodesk, Inc., San Francisco, CA (US)

(*) Notice: Subject to any disclaimer, the term of this patent is extended or adjusted under 35 U.S.C. 154(b) by 665 days.

(21) Appl. No.: 17/005,927

(22) Filed: Aug. 28, 2020

(65) Prior Publication Data

US 2022/0067240 A1    Mar. 3, 2022

(51) Int. Cl.
*G06F 30/23*         (2020.01)
*G06F 30/12*         (2020.01)
(Continued)

(52) U.S. Cl.
CPC ............ *G06F 30/23* (2020.01); *G06F 30/12* (2020.01); *G06F 30/13* (2020.01); *G06T 17/205* (2013.01);
(Continued)

(58) Field of Classification Search
CPC .......... G06F 30/23; G06F 30/12; G06F 30/13; G06F 2111/04; G06F 2111/10;
(Continued)

(56) References Cited

U.S. PATENT DOCUMENTS

| | | | | |
|---|---|---|---|---|
| 9,323,869 | B1* | 4/2016 | Kanthasamy | G06F 30/23 703/1 |
| 10,739,749 | B2* | 8/2020 | Schneider | G05B 19/401 700/160 |
| 2020/0143009 | A1* | 5/2020 | Schmidt | B29C 64/393 700/98 |

OTHER PUBLICATIONS

Wu, Jun, Christian Dick, and Rüdiger Westermann. "A system for high-resolution topology optimization." IEEE transactions on visualization and computer graphics 22.3 (2015): 1195-1208. (Year: 2016).*

(Continued)

*Primary Examiner* — Brian S Cook
(74) *Attorney, Agent, or Firm* — Fish & Richardson P.C.

(57) ABSTRACT

Methods, systems, and apparatus, including medium-encoded computer program products, for computer aided design of physical structures include: obtaining a design space, design criteria, and boundary conditions for numerical simulation; defining an application of the boundary conditions to a voxelized mesh, including specifying a distribution of a load to nodes of voxels in the voxelized mesh that correspond to a surface of preserve geometry; and iteratively modifying a generatively designed three dimensional shape in the design space in accordance with the design criteria and a physical response of the modeled object determined by the numerical simulation performed using the application of the boundary conditions to the voxelized mesh, wherein the distribution of the total loading value during determination of the physical response ensures an equivalence between the total loading value and a sum of loading values distributed to the respective nodes of the voxels that correspond to the surface.

21 Claims, 12 Drawing Sheets

(51) Int. Cl.
- *G06F 30/13* (2020.01)
- *G06T 17/20* (2006.01)
- *G06F 111/04* (2020.01)
- *G06F 111/10* (2020.01)
- *G06F 113/22* (2020.01)

(52) U.S. Cl.
CPC ....... *G06F 2111/04* (2020.01); *G06F 2111/10* (2020.01); *G06F 2113/22* (2020.01)

(58) Field of Classification Search
CPC .............. G06F 2113/22; G06F 2111/06; G06F 2113/10; G06F 2111/00; G06F 2111/02; G06F 2111/08; G06F 2111/12; G06F 2111/14; G06F 2111/16; G06F 2111/18; G06F 2111/20; G06F 2113/00; G06F 2113/02; G06F 2113/04; G06F 2113/06; G06F 2113/08; G06F 2113/12; G06F 2113/14; G06F 2113/16; G06F 2113/18; G06F 2113/20; G06F 2113/24; G06F 2113/26; G06F 2113/28; G06F 2115/00; G06F 2115/02; G06F 2115/04; G06F 2115/06; G06F 2115/08; G06F 2115/10; G06F 2115/12; G06F 2117/00; G06F 2117/02; G06F 2117/04; G06F 2117/06; G06F 2117/08; G06F 2117/10; G06F 2117/12; G06F 2119/00; G06F 2119/02; G06F 2119/04; G06F 2119/06; G06F 2119/08; G06F 2119/10; G06F 2119/12; G06F 2119/14; G06F 2119/16; G06F 2119/18; G06F 2119/20; G06F 2119/22; G06F 30/25; G06F 30/367; G06F 30/398; G06F 30/00; G06F 30/17; G06F 30/18; G06T 17/205; G06T 19/20; G06T 2219/2021; B33Y 50/00
USPC .......................................................... 703/2
See application file for complete search history.

(56) References Cited

OTHER PUBLICATIONS

Sossou, Germain, et al. "Design for 4D printing: A voxel-based modeling and simulation of smart materials." Materials & Design 175 (2019): 107798. (Year: 2019).*

Guodong Fang, Bassam El Said, Dmitry Ivanov, Stephen R. Hallett, Smoothing artificial stress concentrations in voxel-based models of textile composites, Composites Part A: Applied Science and Manufacturing, vol. 80, 2016, pp. 270-284, ISSN 1359-835X (Year: 2015).*

Chai, Xiangfei, et al. "A voxel-based finite element model for the prediction of bladder deformation." Medical physics 39.1 (2012): 55-65. (Year: 2011).*

Liu, Jia, et al. "The application of muscle wrapping to voxel-based finite element models of skeletal structures." Biomechanics and modeling in mechanobiology 11.1 (2012): 35-47. (Year: 2011).*

Kim, Kimin, and Jinah Park. "Virtual bone drilling for dental implant surgery training." Proceedings of the 16th ACM Symposium on Virtual Reality Software and Technology. 2009. (Year: 2009).*

You, C. X., et al. "A generalized computer program for calculating the bearing loads in helical twin screw compressors." (1994). (Year: 1994).*

Bai, Changqing, Hongyan Zhang, and Qingyu Xu. "Effects of axial preload of ball bearing on the nonlinear dynamic characteristics of a rotor-bearing system." Nonlinear Dynamics 53.3 (2008): 173-190. (Year: 2007).*

Bian, Wei, et al. "Thermo-mechanical analysis of angular contact ball bearing." Journal of Mechanical Science and Technology 30.1 (2016): 297-306. (Year: 2015).*

Benson et al., "A Generalized Finite Element Formulation for Arbitrary Basis Functions: From Isogeometric Analysis to XFEM," Int. J. Numer. Meth. Engng 2009, 21 pages.

Unknown Author, "Fusion 360—Generative Explore Results Inconsistent with Validation," (Jul. 2020) [online] (retrieved from https://forums.autodesk.com/t5/fusion-360-design-validate/generative-explore-results-inconsistent-with-validation/m-p/9332957), 3 pages.

Unknown Author, "Interpolation Element," (Jul. 2020) [online] (retrieved from https://functionbay.com/documentation/onlinehelp/default.htm#!Documents/interpolationelement.htm), 2 pages.

Unknown Author, "Local Coordinate Systems—Moldflow Insight 2016," (Jul. 2020) [online] (retrieved from https://knowledge.autodesk.com/support/moldflow-insight/learn-explore/caas/CloudHelp/cloudhelp/2016/ENU/MoldflowInsight/files/GUID-D977E3B1-0789-413B-AF77-40099DF6E285-htm.html), 5 pages.

G. Nikishkov, "Introduction to the Finite Element Method," Aizu-Wakamatsu, Japan, 2004, 45 pages.

Unknown Author, "Rigid Element," (Jul. 2020) [online] (retrieved from https://functionbay.com/documentation/onlinehelp/default.htm#"Documents/rigidelement.htm), 1 page.

Unknown Author, "Saint-Venant's Principle—Wikipedia," (Jul. 2020) [online] (retrieved from https://en.wikipedia.org/w/index.php?title=Saint-Venant%27s_principle&oldid=969196240), 1 page.

* cited by examiner

APPLICATION OF BOUNDARY CONDITIONS ON VOXELIZED MESHES IN COMPUTER AIDED GENERATIVE DESIGN

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold).

In addition, CAD software has been designed so as to perform automatic generation of 3D geometry using topology optimization (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, examples of design constraints include maximum mass, maximum deflection under load, maximum stress, etc.

The inputs to a generative design process can include a set of input solids (B-Rep input) that specify boundary conditions for the generative design process, but many modern generative design solvers do not operate directly on the exact surface boundary representation of their input solids. Instead, B-Reps are sampled and replaced with volumetric representations such as level sets or tetrahedral or hexahedral meshes, which are significantly more convenient and efficient for the physical simulations and material synthesis computed by the solver. The set of input solids can include "preserve bodies", which should always be present in the design and which represent interfaces to other parts or locations on which boundary conditions should be applied (for example mechanical loads and constraints). Other regions in which geometry should or should not be generated can also be provided in a similar manner, such as input solids that define "obstacle bodies", which represent regions where new geometry should not be generated.

SUMMARY

This specification describes technologies relating to computer aided design of physical structures using generative design processes, where boundary conditions are applied on voxelized meshes.

In general, one or more aspects of the subject matter described in this specification can be embodied in one or more methods (and also one or more non-transitory computer-readable mediums tangibly encoding a computer program operable to cause data processing apparatus to perform operations), including: obtaining a design space for a modeled object, one or more design criteria for the modeled object, and one or more boundary conditions for numerical simulation, wherein the modeled object corresponds to a physical structure and includes at least one surface of at least a portion of geometry to be preserved, and the one or more boundary conditions include at least one loading condition specified in relation to the at least one surface; defining an application of the one or more boundary conditions to a voxelized mesh used to represent the modeled object in the design space, wherein the defining the application includes specifying a distribution of a total loading value of the at least one loading condition to respective nodes of voxels in the voxelized mesh that correspond to the at least one surface; iteratively modifying a generatively designed three dimensional shape of the modeled object in the design space in accordance with the one or more design criteria and a physical response of the modeled object determined by the numerical simulation performed using the application of the one or more boundary conditions to the voxelized mesh, wherein the distribution of the total loading value during determination of the physical response ensures an equivalence between the total loading value and a sum of loading values distributed to the respective nodes of the voxels that correspond to the at least one surface; and providing the generatively designed three dimensional shape of the modeled object, which is useable in manufacturing the physical structure using one or more computer-controlled manufacturing systems.

The one or more boundary conditions can include at least one displacement constraint specified in relation to another surface of at least a portion of geometry to be preserved, and the defining the application can include: determining a subset of nodes in the voxelized mesh that are within a threshold distance of the other surface; finding a local coordinate system for the other surface; and specifying the at least one displacement constraint as a single point displacement constraint applied to each of the nodes in the subset of nodes using the local coordinate system to exactly enforce node displacements in one or more directions during the numerical simulation of the physical response of the modeled object.

The at least one loading condition can include a force or moment load, and the defining the application ca include: determining the respective nodes, which are a subset of nodes in the voxelized mesh that are within a threshold distance of the at least one surface; placing a reference node at a centroid of the respective nodes; connecting the reference node at the centroid to the respective nodes with an interpolation constraint element; and specifying the distribution as application of the force or moment load to the reference node to cause the distribution of the total loading, during determination of the physical response, through the interpolation constraint element, which constrains motion at the reference node as a weighted average of the respective nodes, thereby ensuring the equivalence between the total loading value and the sum of the loading values distributed to the respective nodes of the voxels.

The at least one loading condition can include a uniform pressure load, and the defining the application can include: determining the respective nodes, which are a subset of nodes in the voxelized mesh that are within a threshold distance of the at least one surface; computing an area of the at least one surface; finding a normal vector for each of the voxels that correspond to the at least one surface; calculating a force vector for each of the voxels that correspond to the at least one surface, using (i) the normal vector for the voxel, (ii) the area, (iii) the uniform pressure load, and (iv) a total number of the voxels that correspond to the at least one surface; specifying an initial portion of the distribution by specifying application of the force vector for each voxel to nodes of that voxel; computing a residual force, which is a difference between (i) the total loading value on the at least one surface from the uniform pressure load and (ii) an approximate load on the at least one surface from totaling the force vectors for the voxels that correspond to the at least one surface; placing a reference node at a centroid of the respective nodes; connecting the reference node at the centroid to the respective nodes with an interpolation constraint element; and specifying a remaining portion of the distribution as application of the residual force to the reference node to cause distribution of the residual force, during determination of the physical response, through the interpolation constraint element, which constrains motion at the reference node as a weighted average of the respective nodes, thereby ensuring the equivalence between the total loading value and the sum of the loading values distributed to the respective nodes of the voxels.

Finding the normal vector for each of the voxels can include finding eight normal vectors for respective ones of eight vertices of each of the voxels that correspond to the at least one surface. Calculating the force vector for each of the voxels can include calculating eight force vectors for the respective ones of eight vertices of each of the voxels that correspond to the at least one surface, using (i) the respective normal vector for the vertex of the voxel, (ii) the area, (iii) the uniform pressure load, and (iv) a total number of the voxels that correspond to the at least one surface. And specifying the initial portion of the distribution can include specifying application of each of the eight force vectors to respective ones of the eight vertices of each of the voxels that correspond to the at least one surface.

The at least one loading condition can include a bearing load having a bearing coordinate system in relation to the at least one surface, and the defining the application can include: determining the respective nodes, which are a subset of nodes in the voxelized mesh that are within a threshold distance of the at least one surface; finding a bearing angle for each of the voxels that correspond to the at least one surface, wherein the bearing angle is with respect to an axis of the bearing coordinate system; calculating a force vector for each of the voxels that correspond to the at least one surface, using (i) the bearing angles found for the voxels that correspond to the at least one surface, (ii) the bearing load, and (iii) a total number of the voxels that correspond to the at least one surface; specifying an initial portion of the distribution by specifying application of the force vector for each voxel to nodes of that voxel; computing a residual force, which is a difference between (i) the total loading value on the at least one surface from the bearing load and (ii) an approximate load on the at least one surface from totaling the force vectors for the voxels that correspond to the at least one surface; placing a reference node at a centroid of the respective nodes; connecting the reference node at the centroid to the respective nodes with an interpolation constraint element; and specifying a remaining portion of the distribution as application of the residual force to the reference node to cause distribution of the residual force, during determination of the physical response, through the interpolation constraint element, which constrains motion at the reference node as a weighted average of the respective nodes, thereby ensuring the equivalence between the total loading value and the sum of the loading values distributed to the respective nodes of the voxels.

The providing can include: generating toolpath specifications for a manufacturing machine using the three dimensional shape of the modeled object; and manufacturing at least a portion of the physical structure, or a mold for the physical structure, with the manufacturing machine using the toolpath specifications.

In addition, one or more aspects of the subject matter described in this specification can be embodied in one or more systems that include one or more non-transitory computer-readable mediums tangibly encoding a computer program, and one or more data processing apparatus configured to run the instructions of the program to cause the one or more data processing apparatus to perform the operations as specified in the preceding seven paragraphs and as specified in the detailed description below. Moreover, the one or more systems can include the one or more computer-controlled manufacturing systems used to manufacture at least a portion of the physical structure, or a mold for the physical structure, using the toolpath specifications generated using the three dimensional shape of the modeled object.

Particular embodiments of the subject matter described in this specification can be implemented to realize one or more of the following advantages. The application of boundary conditions on voxelized (voxel) meshes can be defined for use in generative design process(es) in a manner that eliminates inaccurate simulation results that would occur with traditional application of boundary conditions on voxelized meshes. Structural elements of a general purpose Finite Element solver can be coupled with a voxel mesh to improve the accuracy of boundary condition application. The advantages of structured meshes can be leveraged to minimize inaccuracies on boundary condition application. Forces and moments can be applied on the voxelized mesh such that the total load specified by the user, in any given direction, is respected. Various types of structural loads can be applied on any suitable type of surface of a 3D object that has been discretized into a voxel mesh representation, with the application occurring to the voxel mesh during numerical simulation of the structural response of the object.

Also, user-specified displacement constraints can be applied in a kinematically correct way. General structural elements, such as local coordinate systems or interpolation constraints, of a voxel-based solver can be leveraged to improve accuracy of boundary condition application. Further, Saint-Venant's principle can be leveraged when applying boundary conditions on preserve geometries in the context of generative design. This approach can produce high quality generative design outcomes, avoiding the inaccuracies of prior approaches to applying boundary conditions during generative design.

The quality of generative design outcomes is a function of the accuracy of the approach used when applying boundary conditions. The approach(es) described in this document provide a robust process that enhances the accuracy of the results, and allows for the application of more complex boundary conditions than would otherwise be possible, while using a 3D voxel mesh in the numerical simulation that guides the generative design process. Note that voxelized meshes are more robust than traditional, conformal meshes, e.g., because of few meshing failures.

Moreover, the approach(es) described in this document allow the use of a coarser (lower resolution) 3D voxel mesh while still retaining accurate boundary condition enforcement, which reduces the need for processing resources and can save computational runtime in a cloud computing environment (and thus save cloud costs when the generative design process is run in the cloud). Thus, the described approach(es) to defining how to apply boundary condition(s) on voxelized meshes improves the technical field of computer-aided design, and in particular, improves the utility of generative design in the technical field of computer-aided design.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
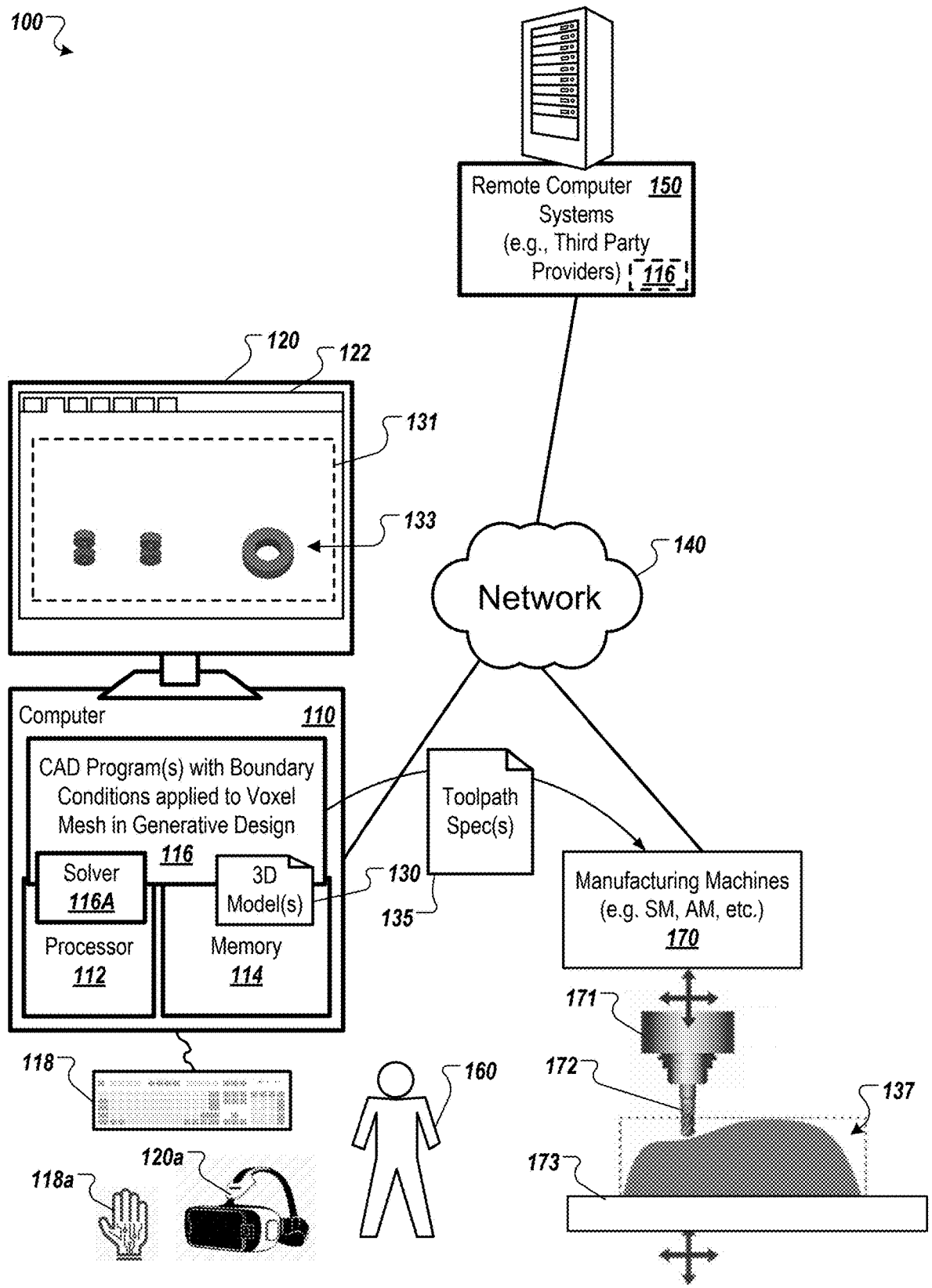
FIG. 1A shows an example of a system usable to define application of boundary conditions to a voxelized mesh used to represent a modeled object during numerical simulation in in a generative design process.

FIG. 1A shows an example of a system 100 usable to define application of boundary conditions to a voxelized mesh used to represent a modeled object during numerical simulation in a generative design process. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and can include one or more generative design processes for topology optimization (e.g., using at least one Solid Isotropic Material with Penalization (SIMP) method or at least one level-set method) with numerical simulation.

Generative design is a process where a designer or engineer can provide a set of requirements in terms of loads, boundary conditions, materials, initial starting shape, manufacturing constraints and other parameters and the CAD program(s) 116 create various shapes that satisfy the requirements. Generative design allows the users to choose from a set of design/shape options that are generated so that specific requirements of the users are met. Further, the numerical simulation performed by the systems and techniques described in this document can simulate one or more physical properties and can use one or more types of simulation to produce a numerical assessment of physical response (e.g., structural response) of the modelled object. For example, finite element analysis (FEA), including linear static FEA, finite difference method(s), and material point method(s) can be used. Further, the simulation of physical properties can also include Computational Fluid Dynamics (CFD), Acoustics/Noise Control, thermal conduction, computational injection molding, electric or electro-magnetic flux, material solidification (which is useful for phase changes in molding processes) simulations, linear transient dynamic analysis, normal mode analysis, buckling analysis, and/or heat transfer analysis.

As used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., generative design and/or numerical simulation operations) "to the cloud" by having one or more programs 116 on one or more computers 150 perform the offloaded processing operations.

In some implementations, numerical simulation is performed in a distinct solver program 116A, e.g., a general purpose Finite Element solver, which can be integrated into CAD program 116 or shared among multiple programs, including CAD program 116. In some implementations, all generative design operations are run by one or more programs in the cloud and not in the B-Rep solid modeler that runs on the local computer. Thus, the solver program 116A can also run in the cloud on one or more computers 150. Moreover, in some implementations, the generative design program(s) can be run in the cloud from an API (Application Program Interface) that is called by a program, without user input through a graphical user interface.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, 120 can include a VR/AR input glove 118a and/or a VR/AR headset 120a. In any case, a user 160 interacts with the CAD program(s) 116 to create and modify 3D model(s), which can be stored in 3D model document(s) 130.

An initial 3D model can be an input to a generative design process. The initial 3D model can be set of preserve bodies 133 and potentially obstacle bodies. The input preserve geometry 133 can be unconnected modelled solids, where the generative design process is used to produce new 3D geometry that connects the input preserve solids 133. A design space 131 can be obtained by determining a bounding volume or a convex hull for the input model, or another technique can be used to obtain the design space 131, which is the volume of space inside which the part is to be designed during topology optimization. In some cases, the user may explicitly specify a solid body as the design space 131, as described in further detail below in connection with FIG. 1B.

Generative design users 160 specify preserve geometries 133 that are connected to the design space 131, which is the only part of the geometry that can change during the optimization phase. The user 160 can define a topology optimization problem for a generative design process to produce a desired 3D model from a starting 3D model, or the input can be a design space 131 without a specific initial 3D model. For example, the design space 131 can be a box-shaped domain in which a density field is defined (with $n_x$ by $n_y$ by $n_z$ elements, where the subscripts x, y and z denote the Cartesian directions). In general, the input design space 131 can be automatically generated or be user specified, the design space 131 can include one or more non-design regions in addition to design regions, and each different region can have different initial volume fractions, different minimum member sizes, different design criteria (e.g., different manufacturing constraints), and model dependent defaults.

As described herein, in some implementations, the CAD program(s) 116 implement at least one generative design process, which enables the CAD program(s) 116 to generate one or more portions of a 3D model (or the entirety of a 3D model) automatically based on design objective(s) and constraint(s), i.e., design criteria, where the geometry of the design is iteratively optimized based on numerical simulation feedback. Note that, as used herein, "optimization" (or "optimum" or "optimizer") does not mean that the best of all possible designs is achieved in all cases, but rather, that a best (or near to best) design is selected from a finite set of possible designs that can be generated, e.g., within an allotted time given the available processing resources and/or in view of competing objectives for the optimization process.

The design criteria can be defined by the user 160, or by another party and imported into the CAD program(s) 116. The design criteria can include structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use; assemblies with linear contact can be supported by the CAD software). One or more of the design criteria (e.g., a stress constraint) can be defined over entire regions in the design space 131 or over individual regions in the design space 131. In addition, the user 160 (or another party) can specify one or more boundary conditions for numerical simulation, e.g., a loading condition and a displacement constraint for use in various types of physics simulations, used during generative design processes.

Figure 1B:
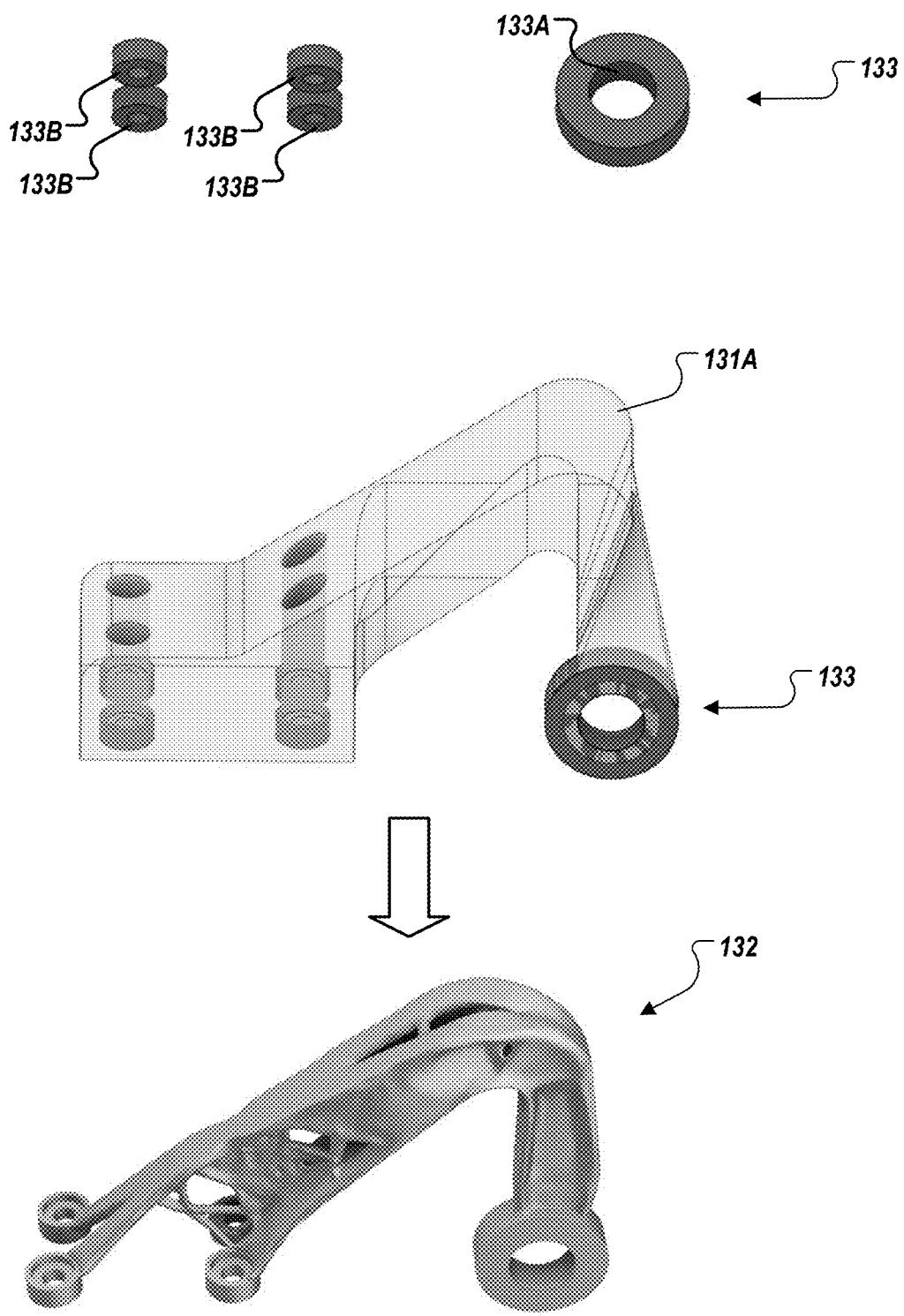
FIG. 1B shows an example of specifying a problem setup for generative design.

FIG. 1B shows an example of specifying a problem setup for generative design. In this example, the preserve geometry 133 consists of five distinct preserve bodies. The boundary conditions for numerical simulation are specified in relation to respective surfaces of these preserve bodies 133. Thus, one or more forces to be applied as part of the numerical simulation can be specified in relation to an inner surface 133A of one of the preserve bodies 133, and a zero displacement constraint can be specified in relation to respective bottom surfaces 133B of the remaining four preserve bodies 133. As will be appreciated, this is but one of many possible examples, and different types of boundary conditions can be specified in relation different surfaces of one or more preserve bodies, or in relation to the same surface of a preserve body.

In this example, a solid body 131A has also been specified as the design space in which the modelled object will be generatively designed. Thus, the problem setup for this generative design example includes the starting body 131A, the preserve geometry 133, and the boundary conditions, which are the force(s) to be applied in relation to the surface 133A and the zero displacement constraint to be applied in relation to the surfaces 133B. This problem setup is then provided to the generative design solver to produce final geometry 132 of a 3D model, which includes the generatively designed 3D shape of the modelled object.

Returning to FIG. 1A, various generative design processes can be used, which can optimize the shape and topology of at least a portion of the 3D model. The optimization of the geometric design of the 3D model(s) by the CAD program(s) 116 can involve topology optimization, which is a method of light-weighting where the optimum distribution of material is determined by minimizing an objective function subject to design constraints (e.g., structural compliance with volume as a constraint). There are two primary categories of topology optimization, density-based approaches and boundary-based approaches. Density-based approaches (e.g., SIMP or homogenized methods) discretize the volume of the part into individual elements, and assign a density to each discrete element. Then the densities are driven toward solid and empty while minimizing the objective(s) subject to the constraints. Boundary-based approaches instead track the shape of the external interface of the solid part and move the boundary such that the constraints are satisfied and the objective(s) are minimized, such as in a level-set method.

As described herein, the boundary condition(s) are applied on voxelized meshes used to represent the modelled objects in the design space during the shape synthesis process based on numerical simulation. But rather than relying on very approximate methods for application of boundary condition(s) on voxel meshes in the context of generative design, which can lead to inaccurate results, local coordinate systems and/or interpolation constraints can be used in a voxel-based solver during generative design to improve the accuracy of boundary condition application. The local effects of boundary condition application on preserve geometries, including any remaining inaccuracies, dissipate once they reach the design space, per Saint-Venant's principle, and so the final generative design will be of high quality, avoiding the inaccuracies of prior approaches to generative design using voxelized meshes.

The quality of generative design outcomes are a function of the accuracy of the approach used when applying boundary conditions, and the approach(es) described in this document provide a robust process that enhances the accuracy of the results, and allows for the application of more complex boundary conditions than would otherwise be possible, while using a 3D voxel mesh in the numerical simulation that guides the generative design process. Moreover, the approach(es) described in this document allow the use of a coarser 3D voxel mesh while still retaining accurate boundary condition enforcement, which will save processing time (and thus cloud costs when the generative design process is run in the cloud). Thus, the described approach(es) to defining how to apply boundary condition(s) on voxelized meshes improves the technical field of computer-aided design, and in particular, improves the utility of generative design in the technical field of computer-aided design.

However, even though a voxel mesh can be used to represent the modelled object during generative design of the object's shape and topology, the CAD program(s) 116 can use a different representation of the geometry for 3D modelling. For example, the CAD program(s) 116 can use a B-Rep model for the input geometry 131A, 133 as well as for final geometry of the 3D model 132 produced using the generative design process, while the geometry generation engine of the generative design process (e.g., implemented in CAD program(s) 116 and potentially solver 116A) can employ a structured voxel mesh, where each element of the 3D mesh is a cube (width=height=length). Note that a structured (regular) mesh is a mesh that has the same topological pattern in all space directions, but a structured mesh is not required in all implementations. In addition, in some implementations, other types of voxelized meshes are used. In general, the voxelized mesh used during the generative design process is composed of linear hexahedrons or cuboids.

In any case, the user 160 can be enabled by the CAD program(s) 116 to define (and redefine) the problem setup and run the generative design process multiple times. Once the user 160 is satisfied with a generatively designed 3D model, the 3D model can be stored as a 3D model document 130 and/or used to generate another representation of the model (e.g., toolpath specifications for a manufacturing system). This can be done upon request by the user 160, or in light of the user's request for another action, such as sending the generatively designed 3D model 130 to one or more computer-controlled manufacturing systems 170, e.g., a subtractive manufacturing (SM) machine 170 or other manufacturing machinery, which can be directly connected to the computer 110, or connected via a network 140, as shown. This can involve a post-process carried out on the local computer 110 or a cloud service to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In addition, the user 160 can save or transmit the 3D model 130 for later use. For example, the CAD program(s) 116 can store or send the document 130 that includes the generated 3D model 132.

The CAD program(s) 116 can provide a document 135 (having toolpath specifications of an appropriate format) to the one or more computer-controlled manufacturing systems 170 to build a structure corresponding to the 3D model, e.g., to SM machine 170 to create a complete structure from stock material 137. An SM machine 170 can employ one or more subtractive manufacturing techniques, e.g., a Computer Numerical Control (CNC) milling machine, such as a multi-axis, multi-tool milling machine. The SM machine 170 can be a 2.5-axis CNC machine, where the freedom of movement of the spindle 171 and attached tool 172 (e.g., a rotary cutter or router selected from a set of available tools) is limited to the x-y plane for most milling, and only moves in the z direction in discrete steps.

However, the SM machine 170 can also be a 3-axis CNC machine, where the spindle 171 has full freedom of movement in each of the x, y and z dimensions, i.e., the tool 172 can move in all three axes simultaneously, or the SM machine 170 can be a multi-axis machine, where the tool 172 can translate in three axes (x, y, z) and rotate in two axes (roll and yaw) simultaneously while cutting a workpiece 137. Note that these additional freedoms of movement can be effected by computer controlled motion of the spindle 171, computer controlled motion of a clamp or anchor point (e.g., machine table) 173 for the part being machined, or both in combination. In addition, rather than (or in addition to) using an SM machine 170, the machine 170 can be an additive manufacturing (AM) machine 170 or other manufacturing machinery, e.g., machinery for casting and forging (both hot and cold).

Figure 1C:
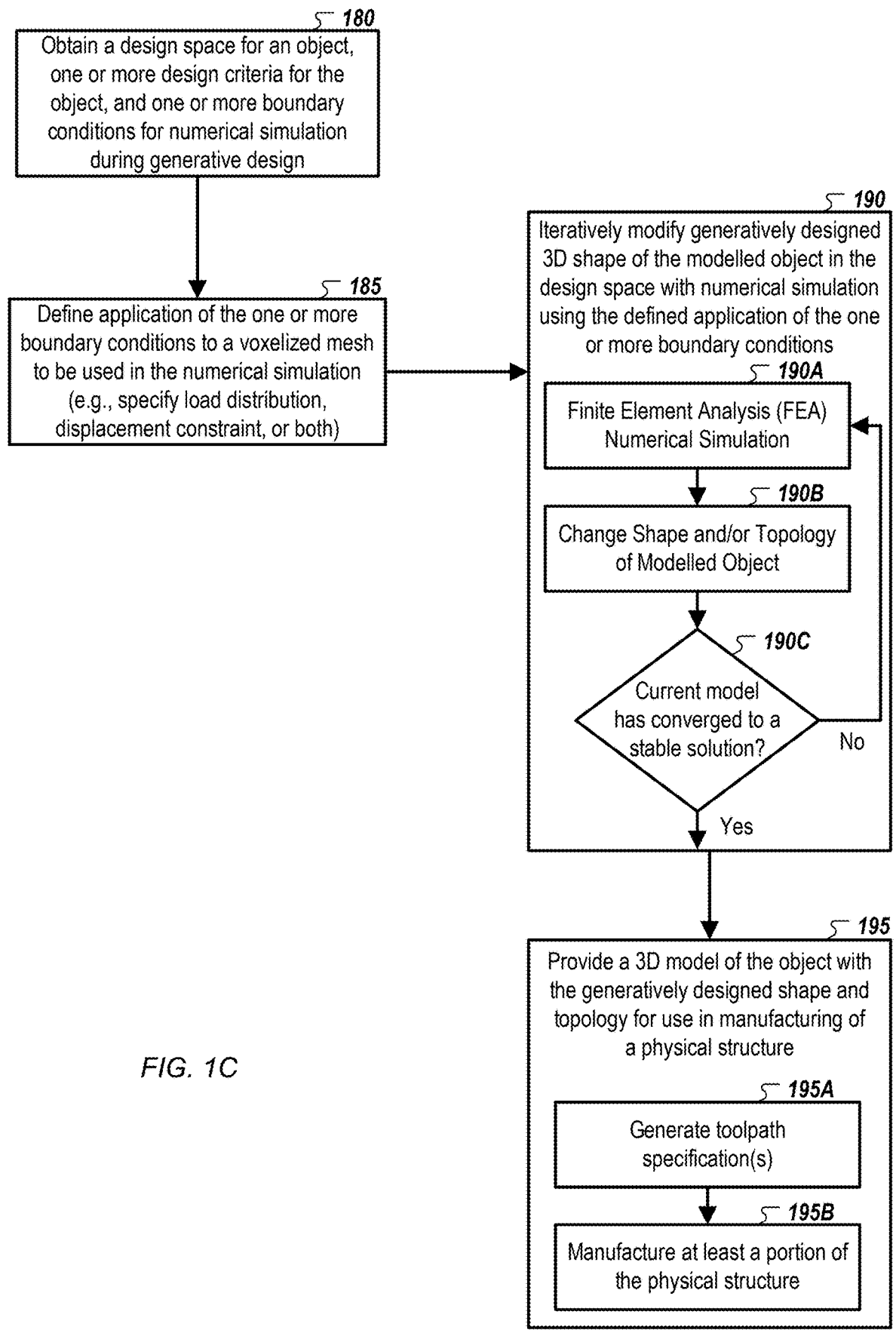
FIG. 1C shows an example of a generative design process with a pre-processing operation to define the application of boundary conditions to a voxelized mesh.

FIG. 1C shows an example of a generative design process with a pre-processing operation to define the application of boundary conditions to a voxelized mesh. A design space for a modeled object, one or more design criteria for the modeled object, and one or more boundary conditions for numerical simulation (during generative design) are obtained 180, e.g., by CAD program(s) 116. The design space for the modelled object is the volume inside which the part is to be designed. The design space can include a bounding volume containing an initial specification of one or more outer shapes of the three dimensional topology for the object. As noted above, the design space can include 3D model(s), designed in or loaded into CAD program(s) 116, e.g., starting solid body 131A in FIG. 1B, which serves as a sub-space of an optimization domain of a generative design process. The design space can also have an associated set of input solids that specify boundary conditions for generative design geometry production, e.g., B-Reps selected using UI 122 to specify sub-space(s) that are preserved for use as connection point(s) with other component(s) in a larger 3D model or separate 3D model(s), e.g., surfaces 133A, 133B of the preserve bodies 133 in FIG. 1B. Note that the boundary condition(s) are specified in relation to a surface of the input solid, not necessarily in relation to the entire input solid.

Thus, in addition to the modeled object corresponding to a physical structure, the modeled object also includes at least one surface of at least a portion of geometry to be preserved, and the one or more obtained 180 boundary conditions are specified in relation to the at least one surface. For example, a loading condition can be specified in relation to surface 133A, and a displacement constraint can be specified in relation to surfaces 133B. In general, the UI 122 can enable the user 160 to generate and/or select any suitable surface(s) with which to specify boundary condition(s). For example, a boundary condition can be specified in relation to a part of a larger surface, which can be selected and then split into pieces before applying a force or constraint to one of the surface pieces.

The design criteria can include design objective(s) and design constraint(s) for the object. Design objectives can include but are not limited to minimizing waste material, minimizing weight of the part, minimizing compliance or maximizing stiffness, minimizing stress, and/or minimizing or maximizing other intrinsic properties of the part, and are used to drive the shape synthesis process towards better designs. Though not required, it is typical for a design objective to be rooted in a simulation of the design, e.g., linear static, fluid dynamic, electromagnetic, etc. Design constraints can include a variety of geometric and physical characteristics or behaviors that should be met in any generated design (requirements either on individual parts or on the entire assembly are also admissible); examples include maximum mass, maximum deflection under load, maximum stress, etc.

Thus, the one or more design criteria are used in the process of iteratively modifying 190, e.g., by CAD program(s) 116, the three dimensional shape of the modeled object in the design space to generatively design the physical structure. This includes modifying both a geometry of the three dimensional shape and a topology of the three dimensional shape in the design space in accordance with the one or more design criteria and a physical response of the modeled object determined by the numerical simulation. As used herein, the "geometry" of the three dimensional shape is the representation of the individual shape elements being deformed during modification, and the "topology" of the three dimensional shape is how the shape elements are bounded and connected in the 3D model (modifying the topology involves adding holes or voids to modify the spatial properties of the surface that are unaffected by continuous deformation without tearing, thus changing how shape elements are bounded and connected in the 3D model).

Note that for structural engineering, topology optimization is the primary technique used to achieve generative design. Topology optimization takes an initially provided shape along with loads, boundary conditions, manufacturing constraints and so on and updates the shape iteratively based on the feedback from structural simulation that is performed on the current shape. Thus, the iteratively modifying 190 is done in accordance with a physical response of the modeled object determined by numerical simulation.

Topology optimization typically leverages Finite Element Analysis (FEA) techniques in order to perform the necessary shape adjustments at each iteration. Thus, the iteratively modifying 190 can be generally understood as performing 190A FEA numerical simulation, changing 190B the shape and/or topology of the modeled object based on the output of the FEA numerical simulation, and continuing to modify the 3D model until the current 3D model has converged 190C to a stable solution (or until a predefined number of iterations). This is true regardless of the specific design criteria used for the iterative topology optimization process, but typically, the objective used in topology optimization (where the objective is minimized by adding/removing material based on given constraint conditions) is compliance or a form of compliance (like strain energy), and the optimization constraints typically restrict the addition/removal of material and also the regions inside the model where the material can be added or removed. The different types of constraints that can be used in topology optimization include: volume fraction constraint (sets a limit on the amount of material that can be removed from the model; as the volume fraction is reached, the optimizer would rearrange the material in the model so that the objective can be reached); stress constraint (limits the amount of stress the model can undergo; the optimizer would add/remove/rearrange the material in the model in order to satisfy this constraint); thickness constraint (limits the thickness of the members/sections in the model; the sections in the model are not allowed to go below the specified thickness); displacement constraint (limits the maximum amount of deformation the model can undergo); and manufacturing constraints (specific to manufacturing methods that are used in the fabrication of the parts/models, such as 3D printing, milling and die-casting).

But the Finite Element Method heavily relies on the underlying mesh used to discretize the computational space. These meshes can conform to the geometry, or alternatively, make use of a voxel-based approach. Voxel meshes need not conform to the geometry, and each element in a given voxel mesh can be identical in size. This approach of using a voxel mesh (which need not conform to the input geometry) is advantageous in the context of generative design because: 1) meshing failures are practically non-existent for voxelized meshes, 2) the number of elements in a voxelized mesh can be easily controlled, 3) optimized shapes show higher quality in terms of smoothness when represented with a voxelized mesh, 4) manufacturing constraints are readily enforced using voxelized meshes for some optimization techniques, such as SIMP, and 5) existing general purpose Finite Element solvers can leverage voxelized meshes. In the context of generative design, the Finite Element numerical simulation of physical response need not use a computational model that conforms to a specific 3D shape, which provides the freedom to represent the model as a voxel mesh. This is helpful because meshing algorithms that generate voxel meshes almost never fail (robustness) in contrast with meshing algorithms that generate conforming finite element meshes that can fail if the geometry gets very complex and/or if the mesh cannot be filled in perfectly.

But one of the main drawbacks of voxel meshes is the correct application of boundary conditions. Conformal geometry approaches can apply boundary conditions in a near-exact form because the mesh (the computational representation) conforms exactly (or nearly exactly) to the shape of the geometry. However, this is not generally the case for voxelized meshes, where the voxel mesh does not necessarily conform to the shape of the geometry of the object. Traditional boundary condition application on voxel meshes is approximate, which can lead to inaccurate results in generative design, resulting in poor designs with little value to the user.

To address this issue, application of the one or more boundary conditions to a voxelized mesh is defined 185, e.g., by CAD program(s) 116, such that the traditional inaccuracies of boundary condition application on voxel meshes is avoided when using the defined application of the one or more boundary conditions during the iteratively modifying 190. Thus, the physics in relation to the boundary conditions can be accurately captured, even though an approximate, voxelized mesh representation of the modelled object is used. For example, the one or more boundary conditions can be at least one loading condition specified in relation to at least one surface of the preserve geometry, and defining 185 the application of the one or more boundary conditions to the voxelized mesh used to represent the modeled object in the design space can involve specifying 185, e.g., by CAD program(s) 116, a distribution of a total loading value of the at least one loading condition to respective nodes of voxels in the voxelized mesh that correspond to the at least one surface. The numerical simulation performed 190A during the iterative loop 190 of the generative design process uses the defined application of the one or more boundary conditions to the voxelized mesh, where the distribution of the total loading value during determination of the physical response ensures an equivalence between the total loading value and a sum of loading values distributed to the respective nodes of the voxels that correspond to the at least one surface. Thus, forces and moments can be applied on the voxelized mesh such that the total load specified by the user, in any given direction, is respected.

As another example, the one or more boundary conditions can be at least one displacement constraint specified in relation to at least one surface of the preserve geometry, and defining 185 the application of the one or more boundary conditions to the voxelized mesh used to represent the modeled object in the design space can involve specifying 185, e.g., by CAD program(s) 116, the at least one displacement constraint as a single point displacement constraint applied to each of multiple nodes using a local coordinate system to exactly enforce node displacements in one or more directions. Thus, user-specified displacement constraints are applied in a kinematically correct way. Further details regarding options for defining 185 the application of the one or more boundary conditions on voxelized meshes in the context of generative design, to minimize inaccuracies on boundary condition application while leveraging the advantages of structured meshes, are provided below in connection with FIGS. 2A-5B, where the described processes compensate/correct for the fact that voxel meshes are used, so as to achieve a higher fidelity application of boundary conditions.

These systems and techniques enable an improvement in accuracy of numerical simulation with a voxel mesh without increasing the resolution of the voxel mesh, thus saving on processing resources (and computational runtime for cloud computing implementations). A coarser mesh can be used, and yet, the entire load can be transmitted into the 3D model while respecting the total specified load, and/or the kinematically correct boundary conditions for displacement constraints can be applied, without having to increase the mesh resolution to obtain the needed accuracy. Thus, the mesh resolution can be kept lower, meaning there are fewer total elements needed in the voxel mesh.

In some implementations, the result of generative design processing is presented to the user, e.g., in UI 122 on display device 120, along with an option to accept or reject the design. In some implementations, the user can select from the final design or any of a variety of previous iterations for each design study. In some implementations, two or more 3D models resulting from the generative design process can be presented to the user along with a trade-off analysis of design complexity versus cost of manufacturing (or any of a variety of other quantities of interest). The trade-off analysis can assist a user 160 in deciding whether to accept or reject one or more 3D models among the presented 3D models.

If the design is rejected, the process of FIG. 1C can return to obtain 180, e.g., by CAD program(s) 116, a new design space and/or new design criteria for use in producing a new generative 3D model. Once a design in not rejected, the process of FIG. 1C can provide 195, e.g., by CAD program(s) 116, the 3D model of the object with the generatively designed shape and topology (potentially after some post-processing of the generative design output, such as conversion into a watertight B-Rep 3D model) for use in manufacturing of the physical structure of the design. The providing 195 can involve sending or saving the 3D model to a permanent storage device for use in manufacturing the physical structure corresponding to the object using SM manufacturing systems. In some implementations, the providing 195 involves generating 195A, e.g., by CAD program(s) 116, toolpath specifications for the computer-controlled manufacturing system(s) using the 3D model, and manufacturing 195B, e.g., by CAD program(s) 116, at least a portion of the physical structure corresponding to the object with the computer-controlled manufacturing system(s) using the toolpath specifications generated for the computer-controlled manufacturing system(s). In some implementations, the providing 195 can include manufacturing a mold for a physical structure using the toolpath specification generated 195A, where the 3D model can be a model of the mold that will be manufactured.

As noted above, inaccurate application of boundary conditions on voxel meshes can be minimized using the systems and techniques described in this document. In some implementations, the breadth of functions that general purpose Finite Element solvers (e.g., solver program 116A) include (e.g., interpolation elements and local coordinate systems) are leveraged with a voxel mesh to obtain a more accurate enforcement of boundary conditions. Table 1 below lists different displacement constraints that can be used in generative design.

TABLE 1

| Type | Location |
| --- | --- |
| Displacement ($U_x$, $U_y$, $U_z$) | Vertex, Edge or Face |
| Cylindrical ($U_r$, $U_\Theta$, $U_z$) | Cylindrical Face |
| Frictionless (Displacement normal to the surface set to zero, $U_n = 0$) | Face |

In Table 1, U denotes displacement; x, y and z represent the Cartesian directions; r, O and z represent the radial, tangential and axial directions in a cylindrical coordinate system, respectively; and n denotes the normal direction to a face.

Figure 2A:
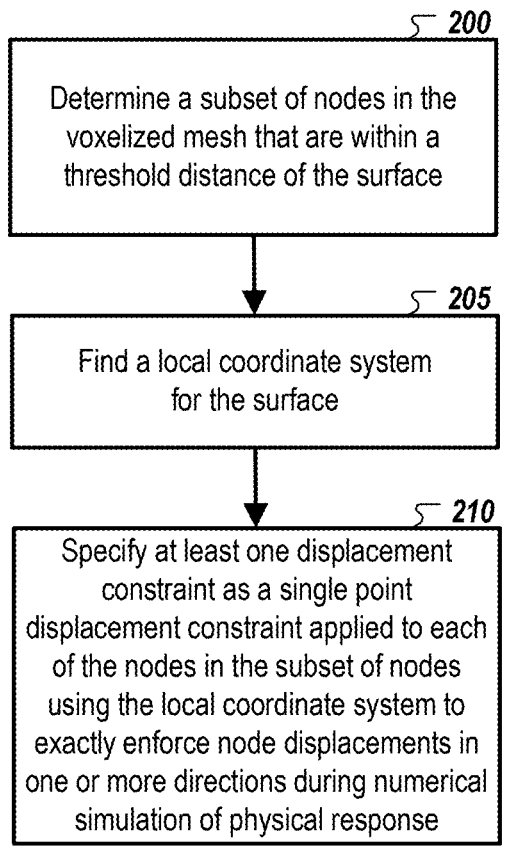
FIG. 2A shows an example of a process to define application of a displacement constraint to a voxelized mesh.

FIG. 2A shows an example of a process to define application of a displacement constraint to a voxelized mesh, e.g., an example of defining 185 from FIG. 1C. A subset of nodes in the voxelized mesh are determined 200, e.g., by CAD program(s) 116, to be within a threshold distance of the surface of the preserve geometry in relation to which the at least one displacement constraint is specified. For example, individual voxels in the mesh can be first identified as corresponding to the input surface used to specify the displacement constraint boundary condition, and then the individual nodes in these voxels that are within the threshold distance of the surface (e.g., within half the size of the voxel) can be identified.

Figure 2B:
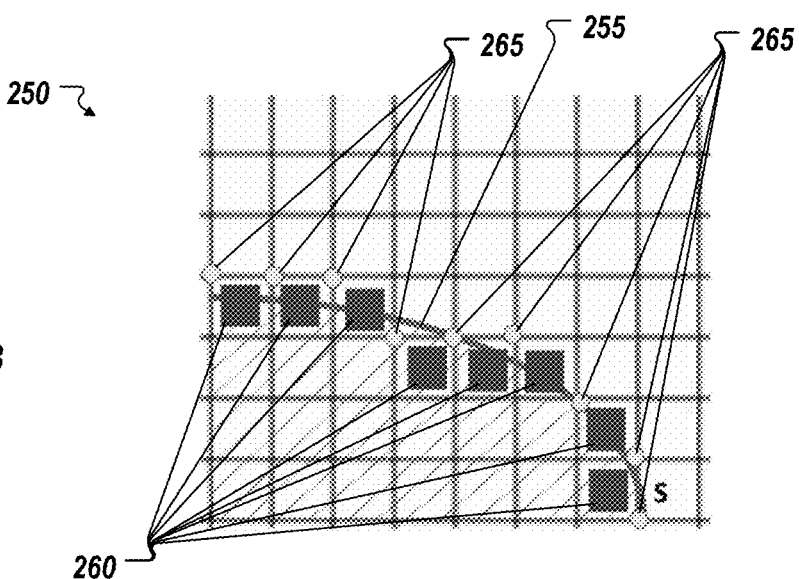
FIG. 2B shows a two-dimensional graphic representation of determining a subset of nodes in a voxelized mesh that are within a threshold distance of a surface in relation to which a loading condition or displacement constraint has been specified.

The displacement constraints shown in Table 1 can all follow a very similar approach as now described. FIG. 2B shows a two-dimensional graphic representation of determining a subset of nodes in a voxelized mesh 250 that are within a threshold distance of a surface 255 in relation to which a loading condition or displacement constraint has been specified. The surface 255 (S) in FIG. 2B is the input surface used to specify the displacement constraint boundary condition. As will be appreciated, the boundary conditions represent external forces that act in an object through a specified surface, such as surface S 255. But in a voxel mesh representation 250, the exact surface(s) of the object are not accessible; rather, the voxels are an approximation of the exact surface(s).

Thus, the voxels 260 that correspond to the surface 255 are identified. In some implementations, the distance of the centroid of each voxel to the surface 255 is used to identify the voxels 260, e.g., using a standard algorithm to find the set of voxels along a surface. Then the nodes 265 that belong to those surface voxels 260 and that are closest to the surface S 255 (by a threshold amount) are identified, e.g., each node of a surface voxel that has a projected distance to the surface 255, which is less than half the size of the voxel, can be added to the subset of nodes 265. With the voxel nodes 265 determined, a set of single point constraints can be applied on each node 265 using Cartesian, cylindrical, or normal to the surface (frictionless) coordinate systems. Note that similar reasoning applies for edges and vertices.

Returning to FIG. 2A, a local coordinate system is found 205, e.g., by CAD program(s) 116, for the surface of the preserve geometry in relation to which the at least one displacement constraint is specified. The local coordinate system is a set of axes associated with each node in the model. As noted above, the local coordinate system can be a Cartesian, cylindrical or normal to the surface (frictionless) coordinate system. The coordinate system is local to the surface of the preserve geometry specified by the user. In some implementations, the local coordinate system is calculated directly from the surface of the preserve geometry in relation to which the at least one displacement constraint is specified. In some implementations, the local coordinate system is calculated using the voxels identified during the determining 200. For example, to find the local coordinate system corresponding to a voxel, the centroid of the voxel can be projected to a point on the surface, and this point on the surface is equipped with its local coordinate system (the tangent and normal directions of the surface at that point gives the local coordinate system of the surface).

In general, the surface itself will be used to determine the local coordinate system. For example, a flat surface can define its coordinate system with one of the axes normal to the surface. As another example, a cylindrical surface can define a cylindrical coordinate system. For a general surface, the local coordinate system can be defined (at least in part) based on user input, e.g., a number of proposed local coordinate systems are presented for the user to select among them. Moreover, in some implementations, a mapping between the B-Rep of the surface and the voxel mesh that represents that surface is maintained, which allows going back and forth between the two, and so, to enforce a displacement constraint, the local coordinate system information from the B-Rep can be passed to the voxel mesh used in the numerical simulation.

The at least one displacement constraint is specified 210 as a single point displacement constraint applied to each of the nodes in the subset of nodes using the local coordinate system to exactly enforce node displacements in one or more directions during the numerical simulation of the physical response of the modeled object. This means the local coordinate system will dictate how the nodes will be displaced, whether that is normal, tangential or radial displacement relative to the surface. In other words, the local coordinate system provides control over exactly how each node is supposed to move. Note that the displacement constraint application doesn't depend on what type of load is being applied.

Leveraging the local coordinate system means the nodes to which the displacement constraint is applied can only move in a specified direction, e.g., tangential to the surface. The displacement constraints are applied on a single local coordinate system. Therefore, all nodes share that local coordinate system, and no two nodes that have been identified as part of a given surface have different local coordinate systems. Using the local coordinate system in this manner leads to a more precise and concise representation of any force specified in that coordinate system (defined in relation to the surface). Calculating displacement in the local coordinate system provides more accuracy in the case of using a voxelized mesh, even when the voxelized mesh is not a very accurate representation of the surface (e.g., an angled plane that is discretized into stair steps when converted to a voxelized mesh; for example, compare FIGS. 7A and 7B).

This is in contrast to using a global coordinate system, which can introduce error because enforcing displacement constraints on a global coordinate system may not accurately capture the correct displacement of the nodes, e.g., specifying zero normal displacements to an angled plane using a global coordinate system may require further modifications to the FEA model and such modifications, such as a penalty method, may still be approximate or the normal displacements to the angled surface may not be exactly zero. But in the local coordinate system, which is sloped to match the surface of the preserve geometry, higher accuracy is achieved. Thus, a local coordinate system can be used in the FEA solver to improve the accuracy of applying displacement constraint boundary conditions, and so user-specified displacement constraints are applied in a kinematically correct way, i.e., the displacement is fixed in a particular direction (whether normal to the surface or not) such that the node of the surface voxel will not move in the particular direction.

In the normal to the surface case, if a node should not move normal to the surface, by using the local coordinate system (LCS) that is aligned with this normal at the surface, and by telling the node not to move in that direction, it is ensured that the node will not move in that direction at all; the node will only move tangentially. This approach can be contrasted with a penalty method, which is not kinematically correct. When using a penalty method, the node is still allowed to move in a direction normal to the surface, even though it shouldn't, and a penalty factor is applied to make it harder for the nodes to move in that direction. But there is still a chance that the node will move in that direction, however small that chance is, which leads to less accurate results.

In addition, interpolation elements in general purpose Finite Element solvers (e.g., solver program 116A) can be leveraged with a voxel mesh to obtain a more accurate enforcement of boundary loading conditions. Table 2 below lists different loads that can be applied in generative design.

TABLE 2

| Type | Location |
| --- | --- |
| Force ($F_x$, $F_y$, $F_z$) | Vertex, Edge or Face |
| Moment ($M_x$, $M_y$, $M_z$) | Face |
| Pressure (Normal to the surface) | Face |
| Bearing load (Normal to the surface) | Cylindrical Face |

In Table 2, F and M denote force and moment, respectively; and x, y and z represent the Cartesian directions.

Figure 3A:
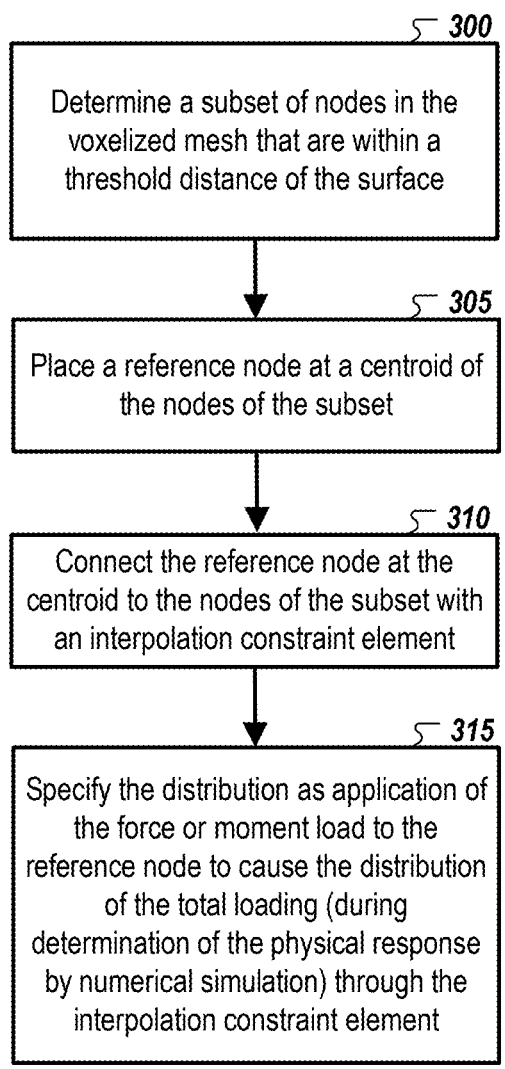
FIG. 3A shows an example of a process to define application of a force or moment load to a voxelized mesh.

FIG. 3A shows an example of a process to define application of a force or moment load to a voxelized mesh, e.g., an example of defining 185 from FIG. 1C. A subset of nodes in the voxelized mesh are determined 300, e.g., by CAD program(s) 116, to be within a threshold distance of the surface of the preserve geometry in relation to which at least one force or moment load is specified. For example, individual voxels in the mesh can be first identified as corresponding to the input surface used to specify the force or moment load boundary condition, and then the individual nodes in these voxels that are within the threshold distance of the surface (e.g., within half the size of the voxel) can be identified. Thus, the subset of the nodes are respective nodes of voxels in the voxelized mesh that correspond to the at least one surface used to specify the boundary condition(s).

Regarding the identification of voxel nodes closest to the surface, a similar approach can be followed for force and moment loads, as discussed above for displacement constraints. Thus, all the types of loading conditions shown in Table 2 can be implemented using the approach described in connection with FIG. 2B for determining a subset of nodes in a voxelized mesh 250 that are within a threshold distance of a surface 255 in relation to which a loading condition has been specified. In addition, for force application, it should be noted that at least one node should be identified at 300; and for moment application, it should be noted that at least three, non-collinear nodes should be identified at 300.

Figure 3B:
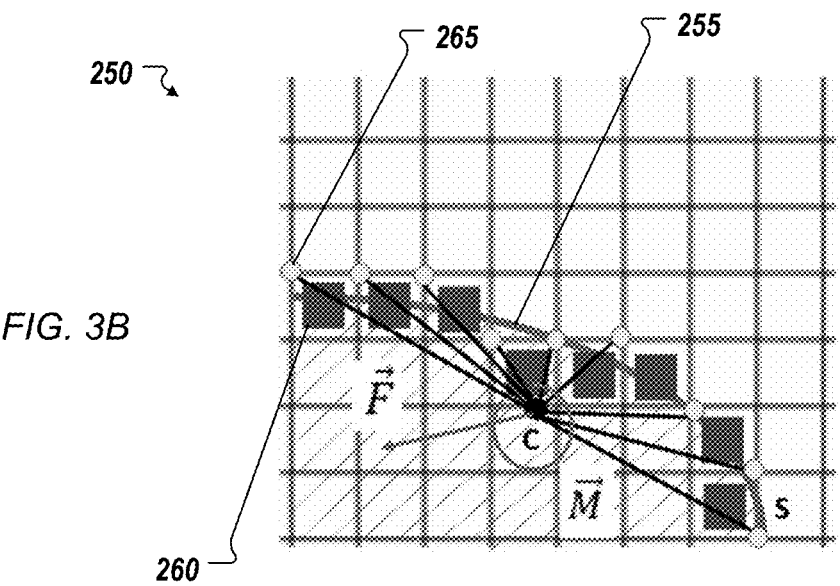
FIG. 3B shows a two-dimensional graphic representation of using an interpolation constraint element to distribute a force or moment load to a surface (in relation to which the force or moment load has been specified) when applying the force or moment load to a voxelized mesh.

Once the subset of nodes (the respective nodes of the surface) is determined 300, a reference node is placed 305 at a centroid of the subset of nodes (the respective nodes). Then the reference node at the centroid is connected 310 to the respective nodes (of the subset) with an interpolation constraint element. FIG. 3B shows a two-dimensional graphic representation of using an interpolation constraint element to distribute a force or moment load to a surface (in relation to which the force or moment load has been specified) when applying the force or moment load to a voxelized mesh 250. In the example of FIG. 3B, the same voxelized mesh 250, the same surface S 255, the same voxels 260 corresponding to the surface S, and the same nodes 265 of the voxels 260 are used as those shown in FIG. 2B, for ease of understanding. But as will be appreciated, even though a loading condition can be specified in relation to the same surface used to specify a displacement constraint, in practice, more than one surface will typically be used to specify separate loading and displacement constraint boundary conditions.

The centroid of the subset of nodes 265 is point C in FIG. 3B, which represents the centroid of the surface S 255. This reference node is connected to the nodes 260 on (or near) the surface S by an interpolation constraint element, e.g., in solver program 116A. The interpolation constraint element is typically available in general purpose Finite Element packages, and it constrains the motion at the reference point C as a weighted average of the nodes 260 on (or near) the surface S. The total force F and moment M on the surface will then be applied on the dependent node located at point C. The interpolation constraint element then automatically distributes the total force and moment to the respective nodes 260 of the surface S during application of the force and moment on surfaces and edges.

In FIG. 3B, point C denotes the location of the surface or edge centroid. Note that the centroid of the nodes on (or near) the surface is used to avoid creating energy (under the principle of virtual work). Forces and moments on edges will follow the same approach as described above. Forces on vertices will be a degenerate case of the one outlined above, as the solution for applying a force to a vertex is trivial.

Returning to FIG. 3A, the distribution of a total loading value of at least one loading condition (to the respective nodes) is specified 315 as application of the force or moment load to the reference node to cause the distribution of the total loading (during determination of the physical response) through the interpolation constraint element, and as noted, the interpolation constraint element constrains motion at the reference node as a weighted average of the respective nodes. This approach provides significant advantages. The load application on the voxelized nodes on the surface is highly simplified and applied exactly at a single node, and then those forces and moments are automatically distributed on the surface via the interpolation constraint element.

Applying the load at a single point that is virtually connected (using the interpolation element) to the voxel mesh nodes identified as corresponding to the surface (against which the boundary condition is specified) is different than just dividing the applied force up into pieces. This latter division of the applied force will not be as accurate as defining the total magnitude of force applied at the centroid of the identified nodes, and then using the interpolation element to effect the distribution of the force. The links between the centroid and the nodes (the interpolation element) will distribute the applied load to the surface accurately and fairly, because the solver will internally distribute the loads in a way that is much more equitable using the weighted average calculations underlying the interpolation constraint element. This use of the interpolation constraint element ensures the equivalence between the total loading value and the sum of the loading values distributed to the respective nodes of the voxels, and so the interpolation constraint element can be used in the FEA solver to improve the accuracy of applying force or moment boundary conditions.

Moreover, this approach works on any suitable type of surface, as may be employed by a user when specifying boundary conditions for use in numerical simulation during generative design. However, variations of this approach can be used for different types of loads, and different error measurement techniques can be used. For example, when a force is applied to a surface, the reaction force of the voxel mesh can be measured, and then a correction can be made if the reaction force differs from the applied force, thus ensuring the equivalence between the total loading value and the sum of the loading values distributed to the respective nodes of the voxels.

Figure 4A:
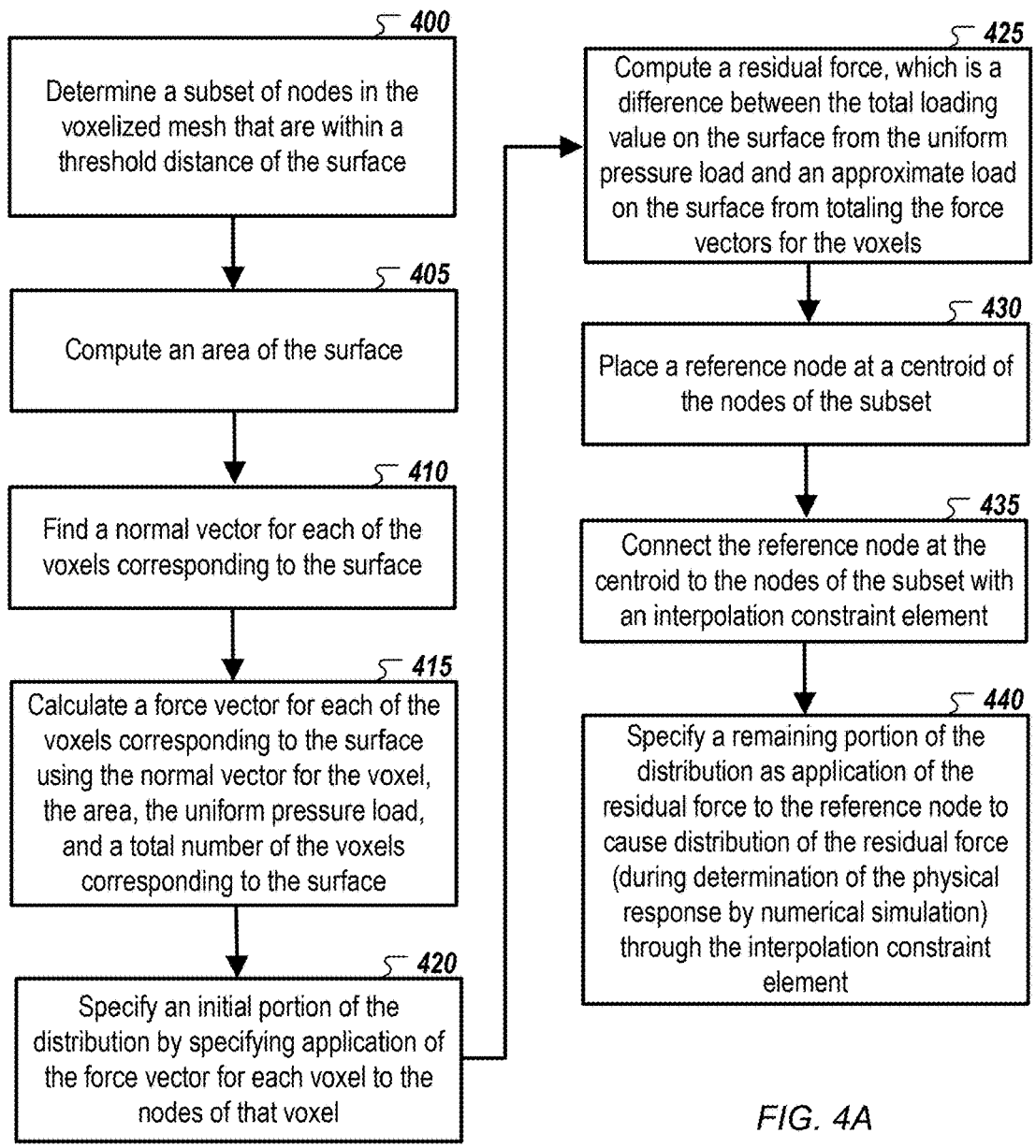
FIG. 4A shows an example of a process to define application of a uniform pressure load to a voxelized mesh.

FIG. 4A shows an example of a process to define application of a uniform pressure load to a voxelized mesh, e.g., an example of defining 185 from FIG. 1C. A subset of nodes in the voxelized mesh are determined 400, e.g., by CAD program(s) 116, to be within a threshold distance of the surface of the preserve geometry in relation to which a uniform pressure load is specified. For example, individual voxels in the mesh can be first identified as corresponding to the input surface used to specify the uniform pressure load boundary condition, and then the individual nodes in these voxels that are within the threshold distance of the surface (e.g., within half the size of the voxel) can be identified. Thus, the subset of the nodes are respective nodes of voxels in the voxelized mesh that correspond to the at least one surface used to specify the uniform pressure load boundary condition.

Figure 4B:
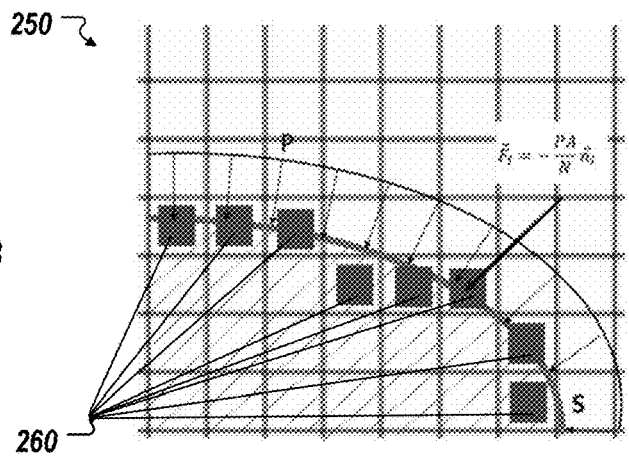
FIG. 4B shows a two-dimensional graphic representation of distributing a uniform pressure load to a surface (in relation to which the uniform pressure load has been specified) when applying the uniform pressure load to a voxelized mesh.

Regarding the identification of voxel nodes closest to the surface, a similar approach can be followed for uniform pressure loads, as discussed above for force and moment loads and displacement constraints. Thus, the approach described in connection with FIG. 2B can be used to determine a subset of nodes in a voxelized mesh 250 that are within a threshold distance of a surface 255 in relation to which a uniform pressure loading condition has been specified. FIG. 4B shows a two-dimensional graphic representation of distributing a uniform pressure load to a surface (in relation to which the uniform pressure load has been specified) when applying the uniform pressure load to a voxelized mesh. In the example of FIG. 4B, the same voxelized mesh 250, the same surface S, and the same voxels 260 corresponding to the surface S are used as those shown in FIG. 2B, for ease of understanding. But as will be appreciated, even though a pressure loading condition can be specified in relation to the same surface used to specify another loading condition or a displacement constraint, in practice, more than one surface will typically be used to specify separate loading and displacement constraint boundary conditions.

In the uniform pressure load case, the number N of voxels 260 on (or near) the surface can be found in the course of determining 400 the respective nodes of the surface, as described above. Next, the total force PA is computed, where P is the uniform pressure and A the surface area. Then, the total force $\vec{F}_i$ on a given voxel i is given by:

$$\vec{F}_i = -\frac{PA}{N}\vec{n}_i \quad (1)$$

where $\vec{n}_i$ is the outward normal to the surface for voxel i (this normal can be found by finding the closest point on the surface to the centroid of the voxel). The forces $\vec{F}_i$ can then be distributed as nodal loads as $\vec{F}_i/8$ on each of the 8 nodes of each linear hexahedron, i.e., of each surface voxel in the voxelized mesh. However, in order to improve accuracy, $\vec{F}_i^v$ can be applied on each vertex of each voxel:

$$\vec{F}_i^v = -\frac{PA}{8N}\vec{n}_i^v \quad (2)$$

where $\vec{n}_i^v$ is the surface normal at each vertex.

Returning to FIG. 4A, once the surface voxels are found, e.g., during the determining 400, for a pressure load, the overall area of the (preserve geometry) surface is computed, the total force is computed, and this total force is divided per surface voxel along the normal for each particular voxel (the nearest normal to the surface). Thus, an area of the at least one surface is computed 405, a normal vector is found 410 for each of the voxels that correspond to the at least one surface, and the force vector changes for each voxel.

A force vector is calculated 415 for each of the voxels that correspond to the at least one surface, e.g., using Equation (1). Thus, the calculating 415 can involve using (i) the normal vector for the voxel, (ii) the area, (iii) the uniform pressure load, and (iv) a total number of the voxels that correspond to the at least one surface. However, in some implementations, Equation (2) is used. Thus, the finding 410 can involve finding eight normal vectors for respective ones of eight vertices of each of the voxels that correspond to the at least one surface, the calculating 415 can involve calculating eight force vectors for the respective ones of eight vertices of each of the voxels that correspond to the at least one surface, using (i) the respective normal vector for the vertex of the voxel, (ii) the area, (iii) the uniform pressure load, and (iv) a total number of the voxels that correspond to the at least one surface.

Moreover, an initial portion of the distribution is specified 420 by specifying application of the force vector for each voxel to nodes of that voxel. In some implementations, this involves evenly spitting the force vector for each surface voxel among the eight vertices for the voxel, in accordance with Equation (1) and $\vec{F}_i/8$. In some implementations, this involves splitting the force unevenly among each vertex based on the orientation of each vertex in each surface voxel with respect to the surface, in accordance with Equation (2). In any case, once the pressure load is divided into pieces for application to the nodes of the surface voxels, the total applied load may not match the pressure load specified by the user, i.e., the total load (given by the user) in any given direction may not be respected.

To address this issue, a residual force can be computed 425, where the residual force is a difference between (i) the total loading value on the at least one surface from the uniform pressure load (e.g., PA) and (ii) an approximate load on the at least one surface from totaling the force vectors for the voxels that correspond to the at least one surface (e.g., the sum of $\vec{F}_i$ over the N surface voxels, or the sum of $$\vec{F}_i^v = -\frac{PA}{8N}\vec{n}_i^v$$

over the N surface voxels and eight nodes per voxel). In some implementations, the exact load on the surface (e.g., a curved surface) is computed 425 using the exact surface and load definition, thus producing the exact total force vector, the approximate total force on the surface (e.g., a curved surface) is computed 425 based on the application of the loading on each surface voxel (the approximate uniform pressure loads), and the residual force vector is computed 425 as the difference between the exact and approximate force vectors.

If the computed 425 residual force is zero, then the total load specified by the user, in any given direction, has been respected. If not, e.g., because the approximation of the applied force has led to a discrepancy, a second order correction can be made to ensure the total specified force is matched. A reference node is placed 430 at a centroid of the subset of nodes (the respective nodes). Then the reference node at the centroid is connected 435 to the respective nodes (of the subset) with an interpolation constraint element.

This involves using the same process described above in connection with FIG. 3B, but now the interpolation constraint element is used to distribute the computed 425 residual force when applying the uniform pressure load to the voxelized mesh 250. Thus, the resultant expectant force is still respected by specifying 440 a remaining portion of the distribution as application of the residual force to the reference node to cause distribution of the residual force (during determination of the physical response) through the interpolation constraint element. As discussed above, the interpolation constraint element constrains motion at the reference node as a weighted average of the respective nodes, thereby ensuring the equivalence between the total loading value and the sum of the loading values distributed to the respective nodes of the voxels. Note that this use of the interpolation constraint element to effect the remaining portion of the distribution of the force provides similar advantages as discussed above in connection with specifying 315 and FIG. 3A.

Figure 5A:
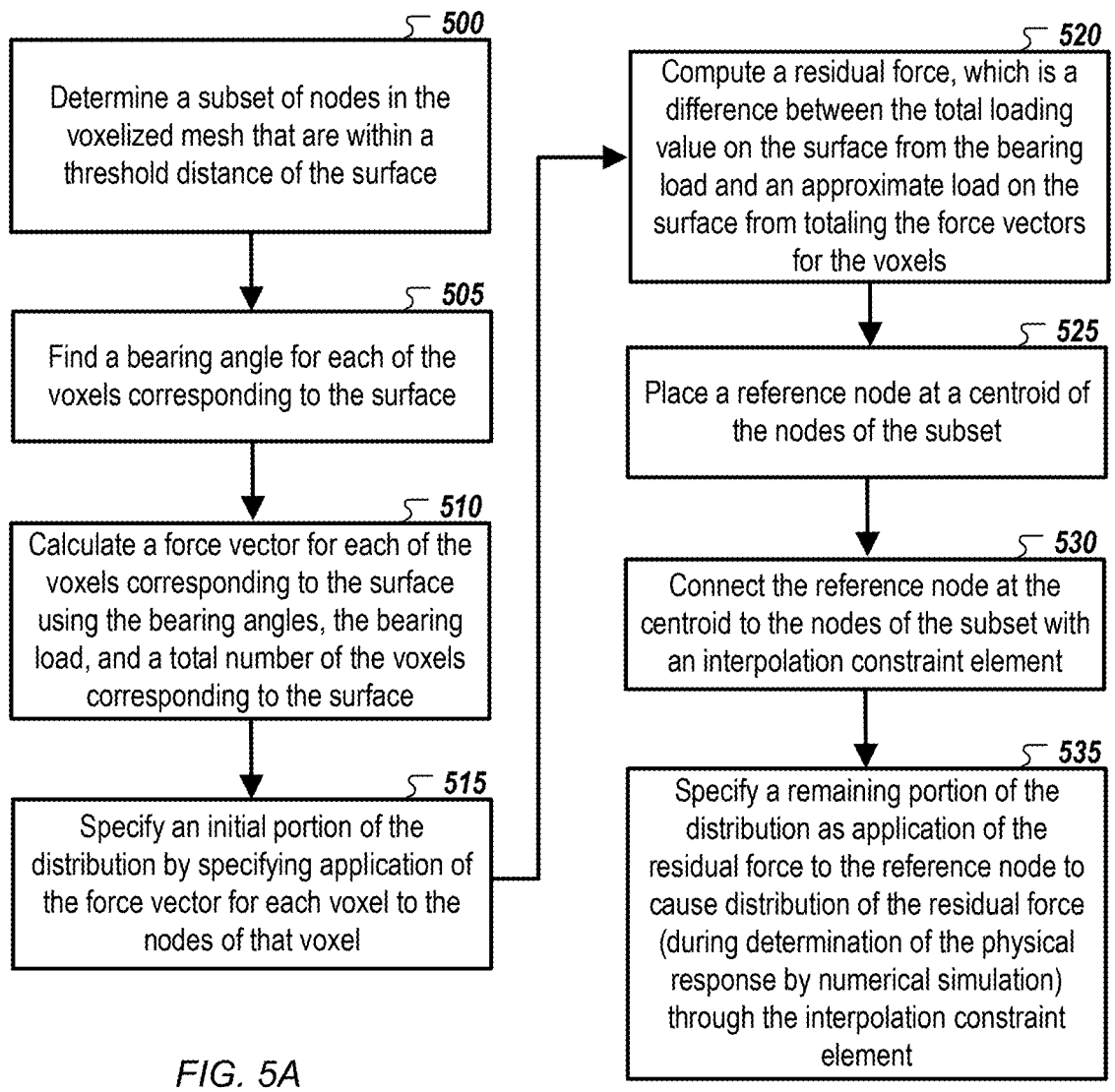
FIG. 5A shows an example of a process to define application of a bearing load to a voxelized mesh.

FIG. 5A shows an example of a process to define application of a bearing load to a voxelized mesh, e.g., an example of defining 185 from FIG. 1C. A subset of nodes in the voxelized mesh are determined 500, e.g., by CAD program(s) 116, to be within a threshold distance of the surface of the preserve geometry in relation to which a bearing load is specified. For example, individual voxels in the mesh can be first identified as corresponding to the input surface used to specify the bearing load boundary condition, and then the individual nodes in these voxels that are within the threshold distance of the surface (e.g., within half the size of the voxel) can be identified. Thus, the subset of the nodes are respective nodes of voxels in the voxelized mesh that correspond to the at least one surface used to specify the bearing load boundary condition.

Figure 5B:
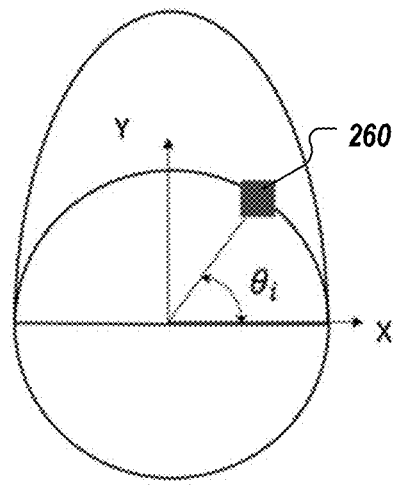
FIG. 5B shows a two-dimensional graphic representation of distributing a bearing load to a surface (in relation to which the bearing load has been specified) when applying the bearing load to a voxelized mesh.

Regarding the identification of voxel nodes closest to the surface, a similar approach can be followed for bearing loads, as discussed above for force and moment loads and displacement constraints. Thus, the approach described in connection with FIG. 2B can be used to determine a subset of nodes in a voxelized mesh 250 that are within a threshold distance of a surface 255 in relation to which a bearing loading condition has been specified, where the bearing load has a bearing coordinate system in relation to the at least one surface. FIG. 5B shows a two-dimensional graphic representation of distributing a bearing load to a surface (in relation to which the bearing load has been specified) when applying the bearing load to a voxelized mesh.

For a bearing load, the magnitude of the load changes based on angle to the surface. A bearing load approximates a pin pressing on a cylindrical surface, and so this load changes (empirically) as shown in FIG. 5B, and thus a calculation is made for each surface voxel 260. For a parabolic pressure distribution, the total bearing load $F_y$, in the bearing coordinate system, can be distributed approximately by:

$$F_y = F_0 \Sigma_{i=1}^{N} \sin^3 \theta_i \quad (3)$$

where N is the total number of voxels that will carry the bearing load, $\theta_i$ is the angle that the line joining the centers of the bearing and voxel makes with respect to the local X axis and $F_0$ is a constant. As shown in FIG. 5B, proper application of a parabolic bearing load depends on the angle made by a line connecting each surface voxel 260 with the center of the bearing, with respect to the X axis of the bearing coordinate system. Further, the constant $F_0$ can be defined as:

$$F_0 = \frac{F_y}{\sum_{i=1}^{N} \sin^3 \theta_i} \quad (4)$$

And the force $\vec{F}_i$ in the bearing coordinate system for each voxel can be defined as:

$$\vec{F}_i = F_0 \begin{bmatrix} \sin^2 \theta_i \cos \theta_i \\ \sin^3 \theta_i \end{bmatrix} \quad (5)$$

The forces $\vec{F}_i$ can then be distributed as nodal loads as $\vec{F}_i/8$ on each of the 8 nodes of each linear hexahedron, i.e., of each surface voxel in the voxelized mesh. However, in order to improve accuracy, $\vec{F}_i^v$ can be applied on each vertex of each voxel, where $\vec{F}_i^v$ is calculated using the angle made by a line connecting each vertex of each surface voxel 260 with the center of the bearing, with respect to the X axis of the bearing coordinate system.

Returning to FIG. 5A, in the bearing load case, the number N of voxels 260 on (or near) the surface can be found in the course of determining 500 the respective nodes of the surface, as described above. A bearing angle is found 505 for each of the voxels that correspond to the at least one surface, where the bearing angle is with respect to an axis of the bearing coordinate system. A force vector is calculated 510 for each of the voxels that correspond to the at least one surface, using (i) the bearing angles found for the voxels that correspond to the at least one surface, (ii) the bearing load, and (iii) a total number of the voxels that correspond to the at least one surface, e.g., using Equations (3)-(5).

An initial portion of the distribution is specified 515 by specifying application of the force vector for each voxel to nodes of that voxel. In some implementations, this involves evenly splitting the force vector for each surface voxel among the eight vertices for the voxel, in accordance with Equation (5) and $\vec{F}_i/8$. In some implementations, this involves splitting the force unevenly among each vertex based on the position of each vertex in each surface voxel with respect to the center of the bearing in the bearing coordinate system. In any case, once the bearing load is divided into pieces for application to the nodes of the surface voxels, the total applied load may not match the bearing load specified by the user, i.e., the total load (given by the user) in any given direction may not be respected.

To address this issue, a residual force can be computed 520, where the residual force is a difference between (i) the total loading value on the at least one surface from the bearing load (e.g., $F_y$) and (ii) an approximate load on the at least one surface from totaling the force vectors for the voxels that correspond to the at least one surface (e.g., the sum of $\vec{F}_i$ over the N surface voxels). In some implementations, the exact load on the surface (e.g., a curved surface) is computed 520 using the exact surface and load definition, thus producing the exact total force vector, the approximate total force on the surface (e.g., a curved surface) is computed 520 based on the application of the loading on each surface voxel (the approximate bearing loads), and the residual force vector is computed 520 as the difference between the exact and approximate force vectors.

If the computed 520 residual force is zero, then the total load specified by the user, in any given direction, has been respected. If not, e.g., because the approximation of the applied force has led to a discrepancy, a second order correction can be made to ensure the total specified force is matched. A reference node is placed 525 at a centroid of the subset of nodes (the respective nodes). Then the reference node at the centroid is connected 530 to the respective nodes (of the subset) with an interpolation constraint element.

This involves using the same process described above in connection with FIG. 3B, but now the interpolation constraint element is used to distribute the computed 520 residual force when applying the bearing load to the voxelized mesh 250. Thus, the resultant expectant force is still respected by specifying 535 a remaining portion of the distribution as application of the residual force to the reference node to cause distribution of the residual force (during determination of the physical response) through the interpolation constraint element. As discussed above, the interpolation constraint element constrains motion at the reference node as a weighted average of the respective nodes, thereby ensuring the equivalence between the total loading value and the sum of the loading values distributed to the respective nodes of the voxels. Note that this use of the interpolation constraint element to effect the remaining portion of the distribution of the force provides similar advantages as discussed above in connection with specifying 315 and FIG. 3A.

Figure 6:
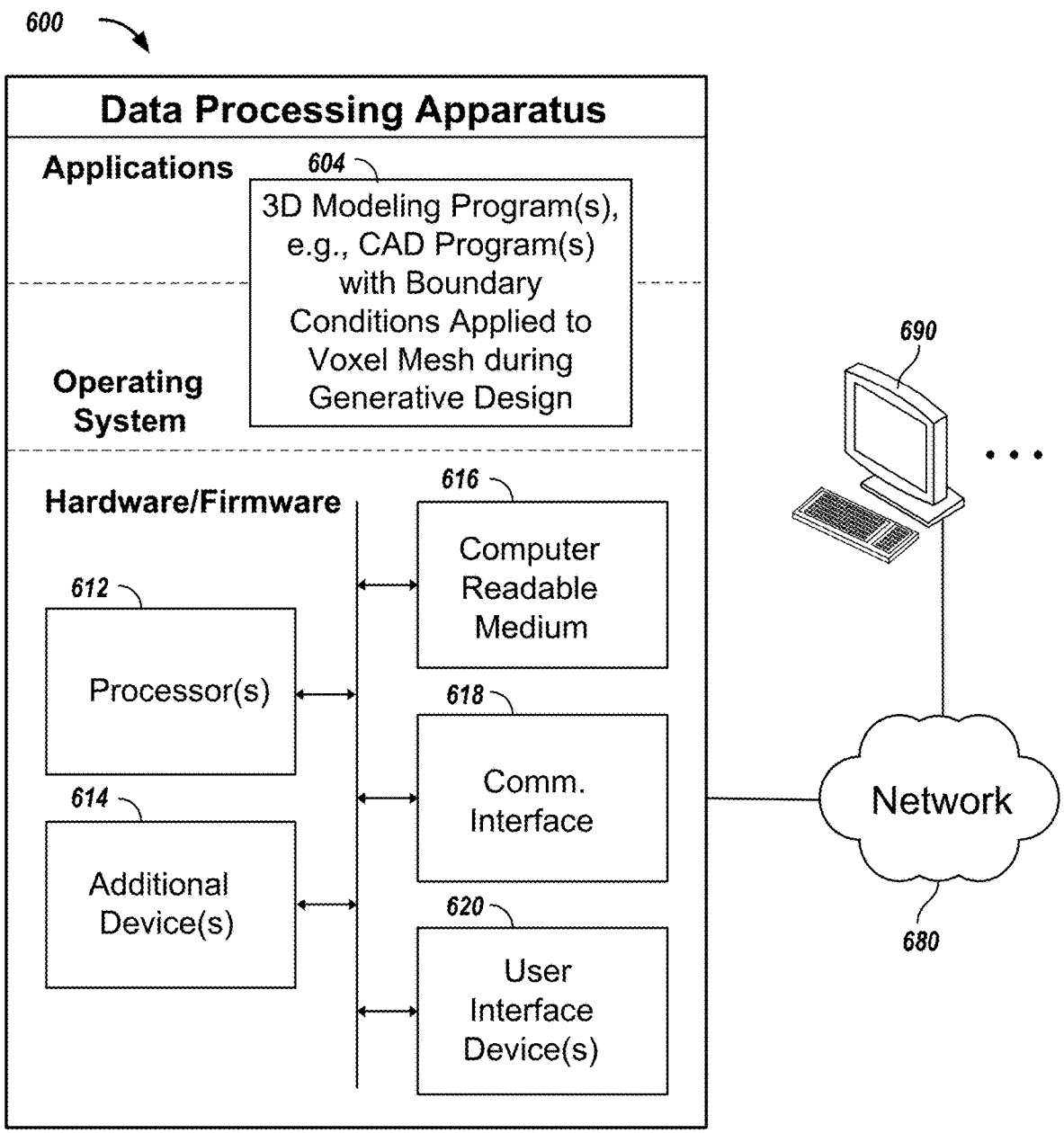
FIG. 6 is a schematic diagram of a data processing system including a data processing apparatus, which can be programmed as a client or as a server to implement the embodiments described in this specification.

FIG. 6 is a schematic diagram of a data processing system including a data processing apparatus 600, which can be programmed as a client or as a server to implement the embodiments described in this specification. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of one or more 3D modeling programs 604 that implement the systems and techniques described above. Thus, the 3D modeling program(s) 604 can be CAD program(s) 604 (such as CAD program(s) 116) that define the boundary conditions (one or more loading conditions and/or one or more displacement constraints) to be applied on voxelized meshes during generative design, and that can implement one or more generative design processes (e.g., using SIMP based method(s) for generative design) for topology optimization and physical numerical simulation operations (finite element analysis (FEA) or other) using the voxelized meshes with boundary conditions application, as defined by the 3D modeling program(s) 604.

The 3D modeling program(s) 604 can enable specification of the boundary conditions using one or more surfaces of one or more keep-in objects (preserve geometry) and can take advantage of Saint-Venant's principle, which states that, at a distance sufficiently removed from a boundary condition, the stress in a structure will be the same for any boundary condition that produces equivalent resultant load. Thus, as one applies a force on keep-in geometry, even if a bit of an error is made, by the time that this error gets to the space to be optimized (within the design space) that error will be dissipated. This allows small errors to be made in application of the boundary conditions to the preserve geometry, which is important because the keep-ins are represented with voxelized meshes, which only approximate the surfaces of the keep-ins.

With the systems and techniques described in this document, the errors associated with application of boundary conditions in a voxelized mesh are substantially reduced, but even if these errors are not eliminated, the end result of the generative design process is still very accurate. Recall that the keep-ins (preserve geometry) are reinstated in their original format (e.g., B-Reps) after the approximation of this preserve geometry is used during generative design, and the geometry that is generated in the design space using the boundary conditions applied to the voxelized mesh representation of the preserve geometry accurately reflects the design criteria used during the generative design process because Saint-Venant's principle means that any remaining error from application of the boundary conditions (forces or displacements) to the voxelized mesh representation of the preserve geometry is dissipated within the design space during the numerical simulation of physical response.

For example, consider a point load applied on a prismatic bar. The stress near the point load will be high, but the stress will be uniformly distributed within the prismatic bar once a distance from the point load of only few inches is reached. Thus, in the context of applying a point load to a surface of a keep-in for generative design, any small error caused by application of the load to the voxelized mesh representing that surface will dissipate as one moves deeper into the design space, and so the overall loading in the design space will be correct as long as one has the right total loading (the total force is the same). Thus, Saint-Venant's principle is leveraged when applying boundary conditions on preserve geometries in the context of generative design, where users specify preserve geometries that are connected to the design space, which is the only part of the geometry that can change during the optimization phase, and the local effects of boundary condition application on preserve geometries (including any remaining inaccuracies) dissipate once they reach the design space, per Saint-Venant's principle.

Figure 7B:
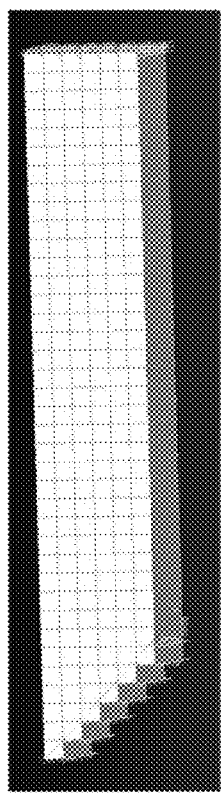
FIGS. 7A-7F show examples of applying boundary conditions to a wedge shaped beam model.
Figure 7D:
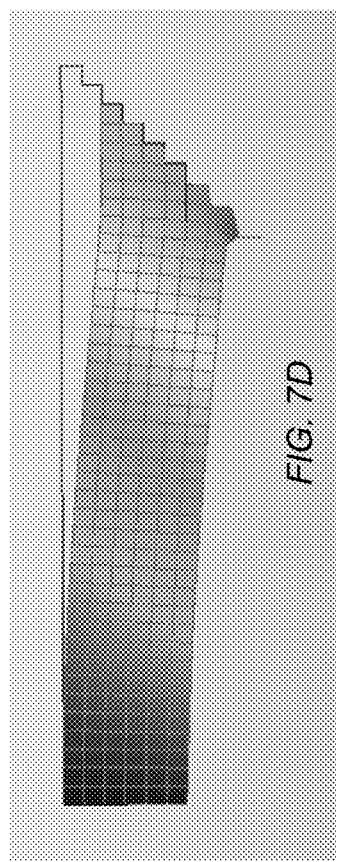
Figure 7F:
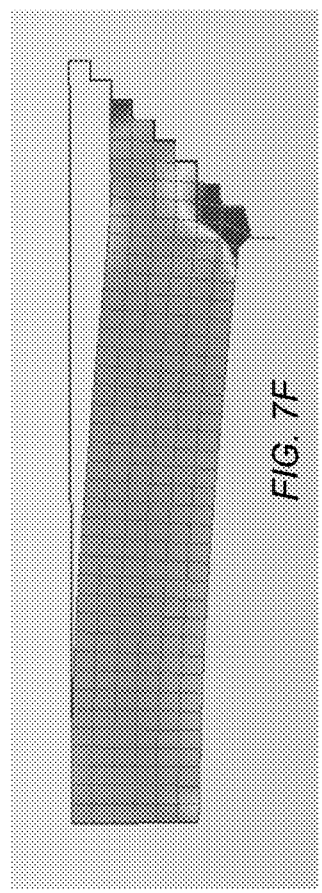
Figure 7A:
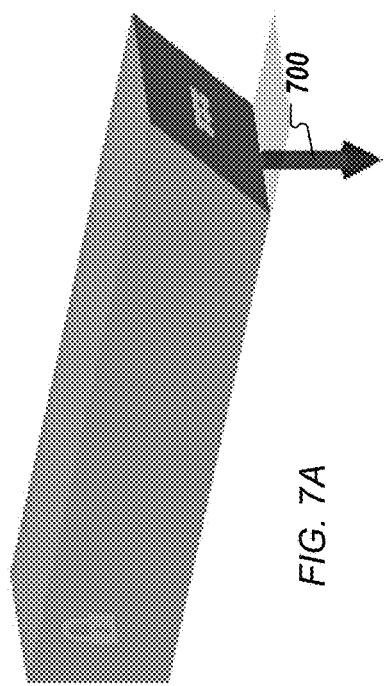

For example, with regard to displacement constraints, FIG. 7A shows a wedge model of a beam, which is clamped at one end, with a vertical load 700 of −10,000 N on an edge, and with a frictionless constraint on the face that is at an angle with the vertical. FIG. 7B shows the voxelized model of the wedge shaped beam from FIG. 7A. The vertical force is applied on the edge with an interpolation constraint, and single point constraints are applied on the nodes closest to the angled surface by leveraging a local coordinate system such that the displacement along the normal direction to the surface vanishes.

Figure 7C:
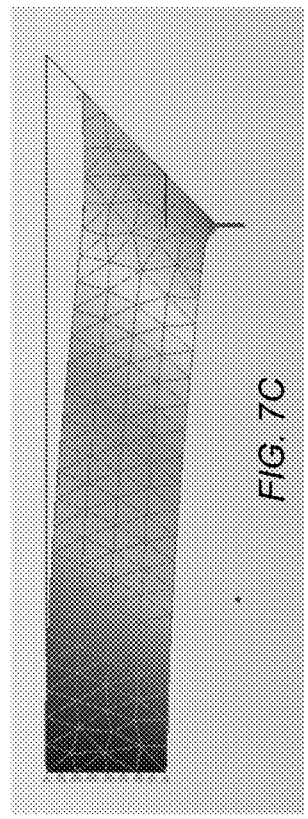
Figure 7E:
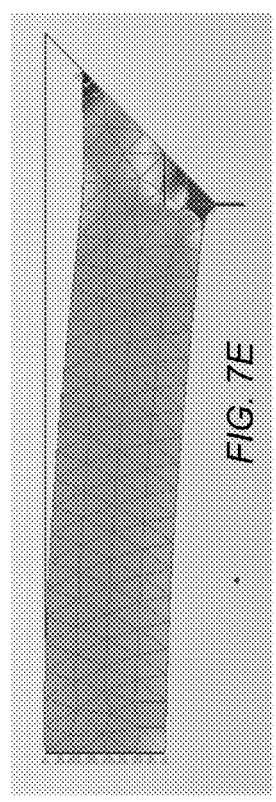

FIGS. 7C-7F compare the displacement and von Mises stress fields of a tetrahedral mesh (with nearly-exact boundary conditions) and the voxelized mesh shown in FIG. 7B. FIGS. 7C and 7E show, respectively, the displacement field and the stress field for a tetrahedral mesh composed of 3032 elements. The tetrahedral mesh is used as a reference. FIGS. 7D and 7F show, respectively, the displacement field and the stress field for the voxelized mesh composed of 1278 elements. As expected, both the displacement and stress fields show very similar contour plots away from the locations where boundary conditions are applied. Also, note that the voxelized mesh has less than half the number of elements as the tetrahedral mesh in this example, which means fewer processing resources (and computational runtime in a cloud computing environment) are required.

Figure 8C:
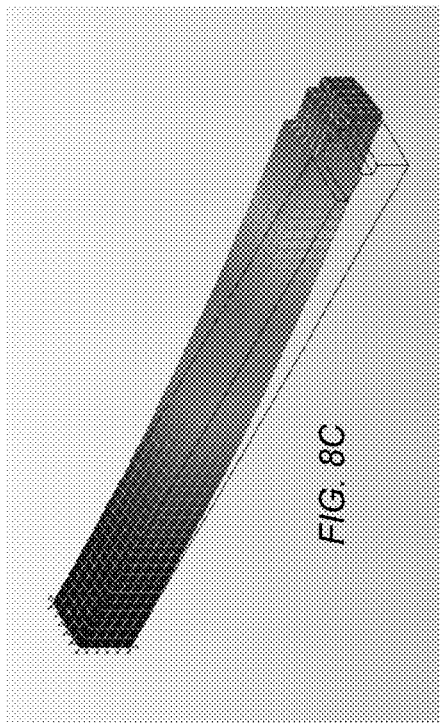
FIGS. 8A-8E show examples of applying a moment load to another beam model.
Figure 8E:
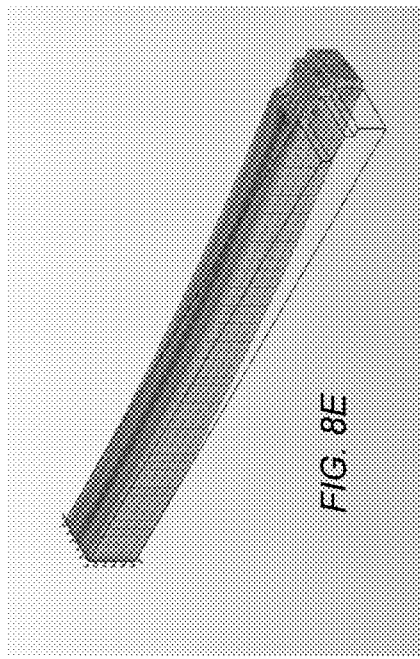
Figure 8A:
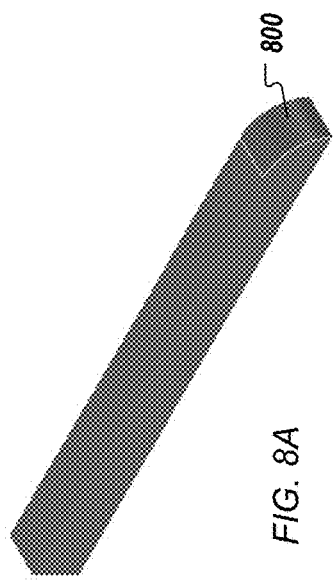
Figure 8B:
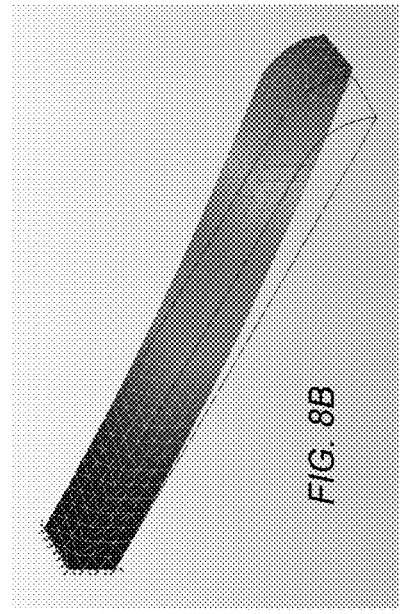
Figure 8D:
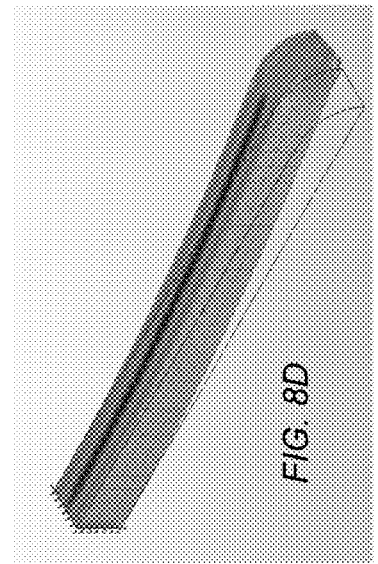

As another example, with regard to moment loads, FIG. 8A shows a beam model with vertical moment applied on the tip, which is a curved surface 800. The beam is fixed at one end with a vertical moment load of 1000 N-m applied vertically on the surface 800, with an interpolation constraint. FIGS. 8B-8E compare the displacement and von Mises stress fields of a tetrahedral mesh (with nearly-exact boundary conditions) with the voxel mesh results. FIGS. 8B and 8D show, respectively, the displacement field and the stress field for a tetrahedral mesh composed of 4500 elements. The tetrahedral mesh is used as a reference. FIGS. 8C and 8E show, respectively, the displacement field and the stress field for the voxelized mesh composed of 1325 elements. As before, the displacement and stress fields show very similar contour plots away from the locations where boundary conditions are applied. Also, in this example, the voxelized mesh has less than a third of the number of elements as the tetrahedral mesh, which means fewer processing resources (and computational runtime in a cloud computing environment) are required.

Figure 9A:
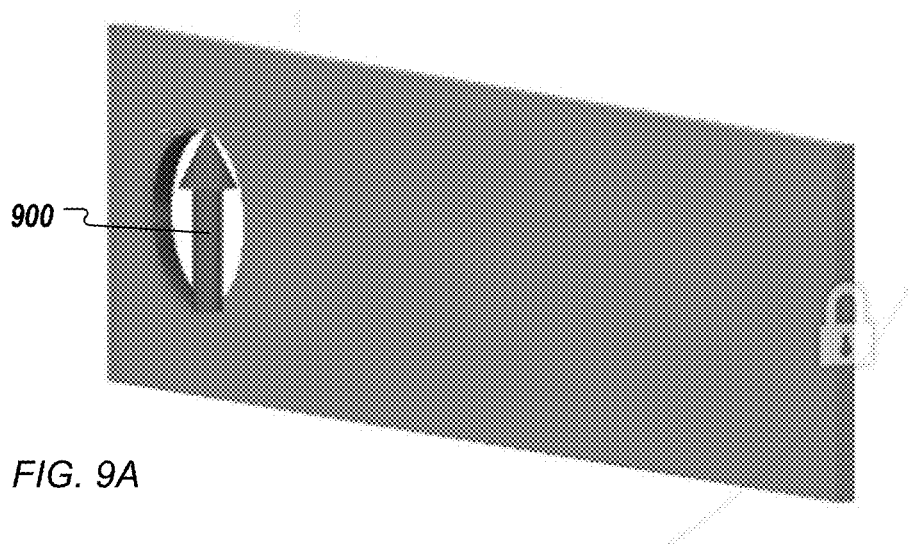
FIGS. 9A-9C show examples of applying a pressure load to a cylindrical surface of a model.
Figure 9B:
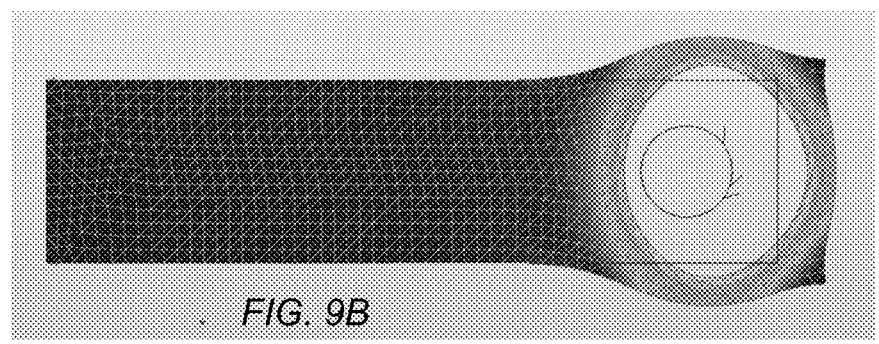
Figure 9C:
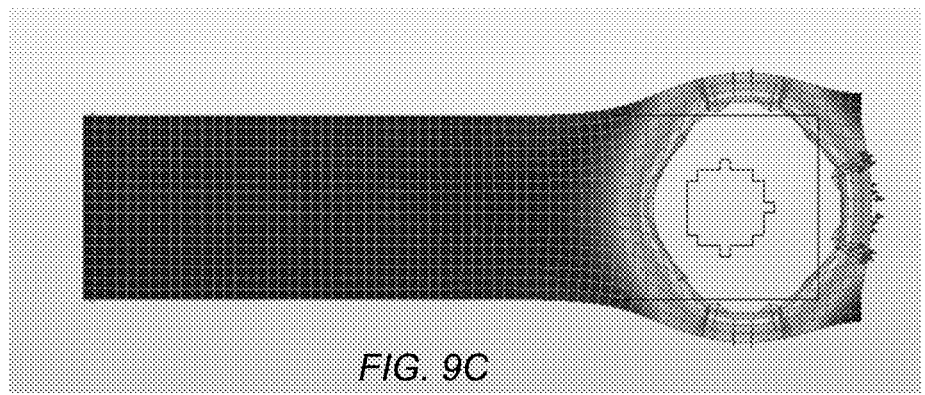

As an example for uniform pressure loads, FIG. 9A shows a beam fixed at one end with a pressure load 900 on a cylindrical surface of 10 MPa. The pressure load is distributed on voxels closest the surface as described above. Since the surface where the load is applied is symmetric, the expected stress away from the area of application is zero, as shown in FIGS. 9B and 9C. FIG. 9B shows the stress field for a tetrahedral mesh composed of 7349 elements, and FIG. 9C shows the stress field for a voxelized mesh composed of 1091 elements. Note that the voxelized mesh has almost one seventh of the number of elements as the tetrahedral mesh in this example, which means fewer processing resources (and computational runtime in a cloud computing environment) are required.

Figure 10A:
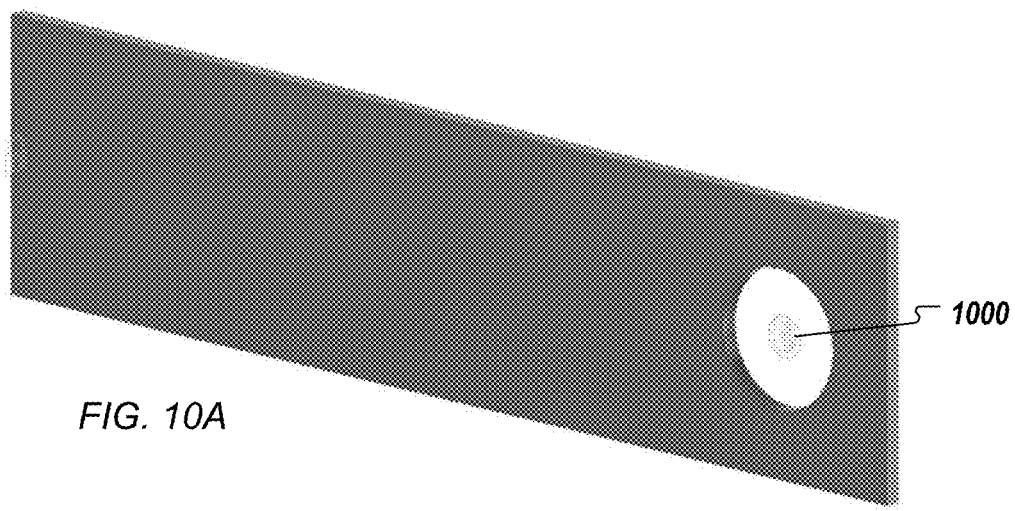
FIGS. 10A-10C show examples of applying a bearing load to a cylindrical surface of a model.
Figure 10B:
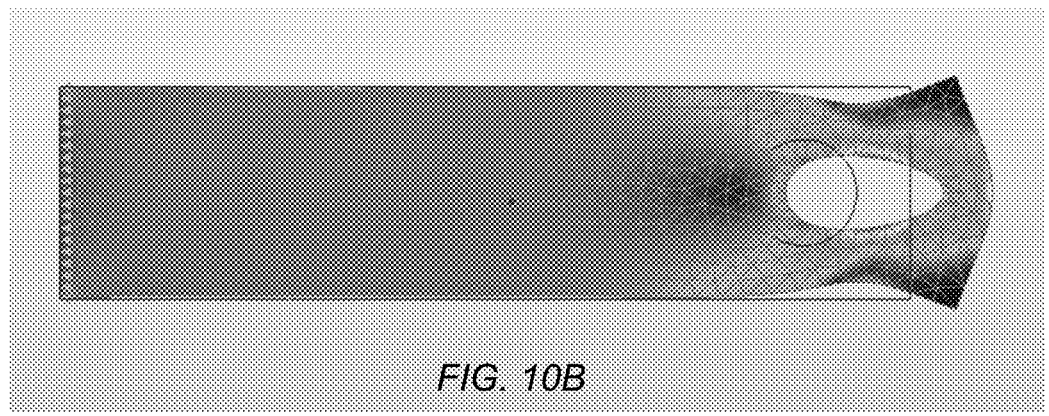
Figure 10C:
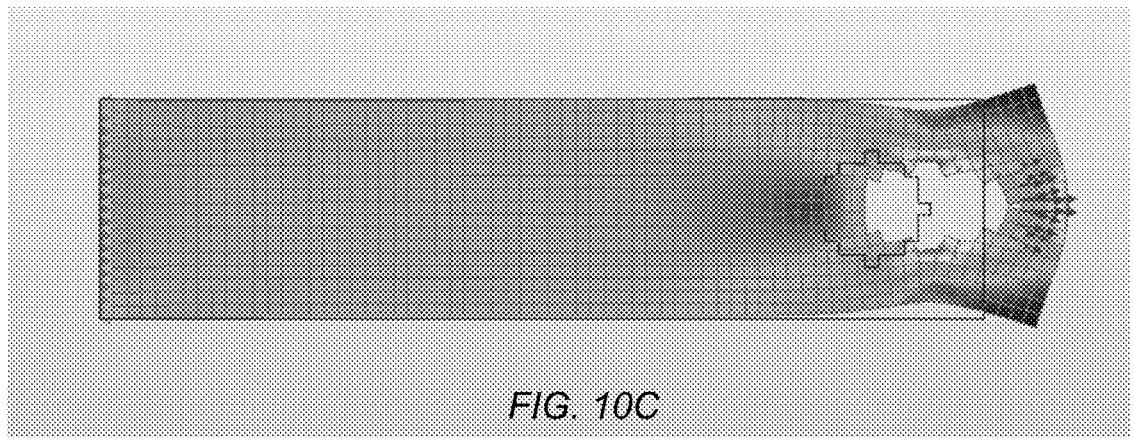

As an example for bearing loads, FIG. 10A shows a beam fixed at one end with an axial bearing load 1000 on the cylindrical surface of 1,000 N. The bearing load 1000 is distributed on voxels closest the surface as described above. FIG. 10B shows the stress field for a tetrahedral mesh composed of 4835 elements, and FIG. 10C shows the stress field for a voxelized mesh composed of 1091 elements. As expected, the stress fields away from the cylindrical surface where the load is applied show nearly identical and uniform values. Also, in this example, the voxelized mesh has less than a fourth of the number of elements as the tetrahedral mesh, which means fewer processing resources (and computational runtime in a cloud computing environment) are required.

Table 3 summarizes the results for the different models discussed above. Note how the proposed approach shows good agreement with the tetrahedral mesh results.

TABLE 3

| Model | Tetrahedral Mesh | Voxel Mesh | % Difference | Notes |
| --- | --- | --- | --- | --- |
| Displacement Constraints | Displacement magnitude at top of wedge: 0.0133 mm | Displacement magnitude at top of wedge: 0.0136 mm | 2.3 | N/A |
| Moment Loads | Max. von Mises stress away from load: 6.02 MPa | Max. von Mises stress away from load: 6.03 MPa | 0.2 | N/A |
| Uniform Pressure | Reaction force magnitude: 2.0e−5 N | Reaction force magnitude: 9.3e−5 N | See notes | Expected reaction load is 0.0 N; Both models approach 0.0 N |
| Bearing Load | von Mises stress away from load: 6.5 MPa | von Mises stress away from load: 6.4 MPa | 1.5 | N/A |

Thus, the effectiveness of the approach has been demonstrated, where the approach seeks to minimize inaccuracies in the application of boundary conditions on voxel meshes in the context of generative design, e.g., by leveraging the capabilities of general purpose Finite Element solvers, such as interpolation elements and local coordinate systems.

Returning to FIG. 6, the program(s) 604 can also potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses the communication interface 618 to communicate with one or more computers 690, for example, over the network 680. Examples of user interface devices 620 include a display, a camera, a speaker, a microphone, a tactile feedback device, a keyboard, a mouse, and VR and/or AR equipment. The data processing apparatus 600 can store instructions that implement operations associated with the program(s) described above, for example, on the computer readable medium 616 or one or more additional devices 614, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A method comprising:
    obtaining a design space for a modeled object, one or more design criteria for the modeled object, and one or more boundary conditions for numerical simulation, wherein the modeled object corresponds to a physical structure, wherein the modeled object comprises a B-Rep solid model of input preserve geometry comprising a surface of the input preserve geometry of the B-Rep solid model, and wherein the one or more boundary conditions comprise a loading condition or a displacement constraint specified in relation to the surface of the input preserve geometry of the B-Rep solid model;
    pre-processing a voxelized mesh used to represent the modeled object in the design space, wherein the voxelized mesh comprises first voxels generated by the input preserve geometry having been converted into the voxelized mesh, and the pre-processing comprises
        identifying second voxels corresponding to the surface, wherein the second voxels are a subset of the first voxels, and the second voxels approximate the surface but do not exactly conform to the surface due to the voxelized mesh being a discretized representation of the input preserve geometry of the B-Rep solid model,
        identifying individual nodes of the second voxels that each have a respective projected distance to the surface that is less than a threshold distance, wherein the individual nodes are a subset of nodes of the second voxels, and
        specifying a distribution of the loading condition or the displacement constraint, which has been specified in relation to the surface of the input preserve geometry of the B-Rep solid model, to the second voxels using the individual nodes from the identifying;
    iteratively modifying a generatively designed three dimensional shape of the modeled object in the design space in accordance with the one or more design criteria and a physical response of the modeled object determined by the numerical simulation performed by a voxel-based solver using the distribution, which was specified using the individual nodes during the pre-processing before the iteratively modifying begins, to enforce the one or more boundary conditions in the voxelized mesh; and
    providing the generatively designed three dimensional shape of the modeled object, which is useable in manufacturing the physical structure using one or more computer-controlled manufacturing systems.

2. The method of claim 1, wherein the one or more boundary conditions comprise the displacement constraint specified in relation to the surface, the pre-processing comprises
    finding a single coordinate system local to the surface of the input preserve geometry of the B-Rep solid model, and
    specifying the distribution comprises applying a single point displacement constraint to each of the individual nodes using the single coordinate system to exactly enforce node displacements in one or more directions during the numerical simulation of the physical response of the modeled object.

3. The method of claim 1, wherein the surface is a curved surface, the input preserve geometry comprises an additional surface other than the curved surface, the one or more boundary conditions comprise (i) a zero displacement constraint specified in relation to the additional surface of the input preserve geometry of the B-Rep solid model and (ii) the loading condition comprising a force or moment load specified in relation to the curved surface, and specifying the distribution comprises:
    placing a reference node at a centroid of the individual nodes of the second voxels;
    connecting the reference node at the centroid to the individual nodes with an interpolation constraint element; and
    applying the force or moment load to the reference node to cause the distribution of a total loading value of the loading condition, during determination of the physical response, through the interpolation constraint element, which constrains motion at the reference node as a weighted average of the individual nodes, thereby ensuring equivalence between the total loading value and a sum of loading values distributed to the individual nodes of the second voxels.

4. The method of claim 1, wherein the surface is a curved surface, the one or more boundary conditions comprise the loading condition comprising a uniform pressure load specified in relation to the curved surface, and specifying the distribution comprises:
    computing an area of the curved surface;
    finding a normal vector for each of the second voxels;
    calculating a force vector for each of the second voxels using the normal vector for that voxel multiplied by the area of the curved surface and the uniform pressure load, which are divided by a total number of the second voxels;

specifying an initial portion of the distribution by specifying application of the force vector for each voxel to nodes of that voxel;

computing a residual force, which is a difference between (i) a total loading value on the curved surface from the uniform pressure load and (ii) an approximate load on the curved surface from totaling the force vectors for the second voxels;

placing a reference node at a centroid of the individual nodes of the second voxels;

connecting the reference node at the centroid to the individual nodes of the second voxels with an interpolation constraint element; and specifying a remaining portion of the distribution as application of the residual force to the reference node to cause distribution of the residual force, during determination of the physical response, through the interpolation constraint element, which constrains motion at the reference node as a weighted average of the individual nodes, thereby ensuring equivalence between the total loading value and a sum of loading values distributed to the individual nodes of the second voxels.

5. The method of claim 4, wherein finding the normal vector for each of the second voxels comprises finding eight normal vectors for respective ones of eight vertices of each of the second voxels, calculating the force vector for each of the second voxels comprises calculating eight force vectors for the respective ones of eight vertices of each of the second voxels using the respective normal vector for the vertex of that voxel multiplied by the area of the curved surface and the uniform pressure load, which are divided by eight and by the total number of the second voxels, and specifying the initial portion of the distribution comprises specifying application of each of the eight force vectors to respective ones of the eight vertices of each of the second voxels.

6. The method of claim 1, wherein the one or more boundary conditions comprise the loading condition comprising a bearing load having a bearing coordinate system specified in relation to the surface, and specifying the distribution comprises:

finding a bearing angle for each of the second voxels, wherein the bearing angle is with respect to an axis of the bearing coordinate system;

calculating a force vector for each of the second voxels using (i) the bearing angles found for the second voxels, (ii) the bearing load, and (iii) a total number of the second voxels;

specifying an initial portion of the distribution by specifying application of the force vector for each voxel to nodes of that voxel;

computing a residual force, which is a difference between (i) a total loading value on the surface from the bearing load and (ii) an approximate load on the surface from totaling the force vectors for the second voxels;

placing a reference node at a centroid of the individual nodes of the second voxels;

connecting the reference node at the centroid to the individual nodes of the second voxels with an interpolation constraint element; and specifying a remaining portion of the distribution as application of the residual force to the reference node to cause distribution of the residual force, during determination of the physical response, through the interpolation constraint element, which constrains motion at the reference node as a weighted average of the individual nodes, thereby ensuring equivalence between the total loading value and a sum of loading values distributed to the individual nodes of the second voxels.

7. The method of claim 1, wherein the threshold distance is half of a size of a voxel in the voxelized mesh, and the providing comprises:

generating toolpath specifications for a manufacturing machine using the three dimensional shape of the modeled object; and manufacturing at least a portion of the physical structure, or a mold for the physical structure, with the manufacturing machine using the toolpath specifications.

8. A system comprising:

a non-transitory storage medium having instructions of a computer aided design program stored thereon; and one or more data processing apparatus configured to run the instructions of the computer aided design program to cause the one or more data processing apparatus to obtain a design space for a modeled object, one or more design criteria for the modeled object, and one or more boundary conditions for numerical simulation, wherein the modeled object corresponds to a physical structure, wherein the modeled object comprises a B-Rep solid model of input preserve geometry comprising a surface of the input preserve geometry of the B-Rep solid model, and wherein the one or more boundary conditions comprise a loading condition or a displacement constraint specified in relation to the surface of the input preserve geometry of the B-Rep solid model, pre-process a voxelized mesh used to represent the modeled object in the design space, wherein the voxelized mesh comprises first voxels generated by the input preserve geometry having been converted into the voxelized mesh, and the voxelized mesh is pre-processed by operations comprising identifying second voxels corresponding to the surface, wherein the second voxels are a subset of the first voxels, and the second voxels approximate the surface but do not exactly conform to the surface due to the voxelized mesh being a discretized representation of the input preserve geometry of the B-Rep solid model, identifying individual nodes of the second voxels that each have a respective projected distance to the surface that is less than a threshold distance, wherein the individual nodes are a subset of nodes of the second voxels, and specifying a distribution of the loading condition or the displacement constraint, which has been specified in relation to the surface of the input preserve geometry of the B-Rep solid model, to the second voxels using the individual nodes from the identifying, iteratively modify a generatively designed three dimensional shape of the modeled object in the design space in accordance with the one or more design criteria and a physical response of the modeled object determined by the numerical simulation performed by a voxel-based solver using the distribution, which was specified using the individual nodes during the pre-process before the iteratively modification begins, to enforce the one or more boundary conditions in the voxelized mesh, and provide the generatively designed three dimensional shape of the modeled object, which is useable in manufacturing the physical structure using one or more computer-controlled manufacturing systems.

9. The system of claim 8, wherein the one or more boundary conditions comprise the displacement constraint specified in relation to the surface, and the instructions cause the one or more data processing apparatus to pre-process the voxelized mesh by causing the one or more data processing apparatus to:
find a single coordinate system local to the surface of the input preserve geometry of the B-Rep solid model; and
specify the distribution by applying a single point displacement constraint to each of the individual nodes using the single coordinate system to exactly enforce node displacements in one or more directions during the numerical simulation of the physical response of the modeled object.

10. The system of claim 8, wherein the surface is a curved surface, the input preserve geometry comprises an additional surface other than the curved surface, the one or more boundary conditions comprise (i) a zero displacement constraint specified in relation to the additional surface of the input preserve geometry of the B-Rep solid model and (ii) the loading condition comprising a force or moment load specified in relation to the curved surface, and the instructions cause the one or more data processing apparatus to specify the distribution by causing the one or more data processing apparatus to:
place a reference node at a centroid of the individual nodes of the second voxels;
connect the reference node at the centroid to the individual nodes with an interpolation constraint element; and
apply the force or moment load to the reference node to cause the distribution of a total loading value of the loading condition, during determination of the physical response, through the interpolation constraint element, which constrains motion at the reference node as a weighted average of the individual nodes, thereby ensuring equivalence between the total loading value and a sum of loading values distributed to the individual nodes of the second voxels.

11. The system of claim 8, wherein the surface is a curved surface, the one or more boundary conditions comprise the loading condition comprising a uniform pressure load specified in relation to the curved surface, and the instructions cause the one or more data processing apparatus to specify the distribution by causing the one or more data processing apparatus to:
compute an area of the curved surface;
find a normal vector for each of the second voxels;
calculate a force vector for each of the second voxels, using the normal vector for that voxel multiplied by the area of the curved surface and the uniform pressure load, which are divided by a total number of the second voxels;
specify an initial portion of the distribution by specifying application of the force vector for each voxel to nodes of that voxel;
compute a residual force, which is a difference between (i) a total loading value on the curved surface from the uniform pressure load and (ii) an approximate load on the curved surface from totaling the force vectors for the second voxels;
place a reference node at a centroid of the individual nodes of the second voxels;
connect the reference node at the centroid to the individual nodes of the second voxels with an interpolation constraint element; and
specify a remaining portion of the distribution as application of the residual force to the reference node to cause distribution of the residual force, during determination of the physical response, through the interpolation constraint element, which constrains motion at the reference node as a weighted average of the individual nodes, thereby ensuring equivalence between the total loading value and a sum of loading values distributed to the individual nodes of the second voxels.

12. The system of claim 11, wherein the instructions cause the one or more data processing apparatus to find the normal vector for each of the second voxels by causing the one or more data processing apparatus to find eight normal vectors for respective ones of eight vertices of each of the second voxels, the instructions cause the one or more data processing apparatus to calculate the force vector for each of the second voxels by causing the one or more data processing apparatus to calculate eight force vectors for the respective ones of eight vertices of each of the second voxels using the respective normal vector for the vertex of that voxel multiplied by the area of the curved surface and the uniform pressure load, which are divided by eight and by the total number of the second voxels, and by causing the one or more data processing apparatus to specify the initial portion of the distribution by causing the one or more data processing apparatus to specify application of each of the eight force vectors to respective ones of the eight vertices of each of the second voxels.

13. The system of claim 8, wherein the one or more boundary conditions comprise the loading condition comprising a bearing load having a bearing coordinate system specified in relation to the surface, and the instructions cause the one or more data processing apparatus to specify the distribution by causing the one or more data processing apparatus to:
find a bearing angle for each of the second voxels, wherein the bearing angle is with respect to an axis of the bearing coordinate system;
calculate a force vector for each of the second voxels using (i) the bearing angles found for the second voxels, (ii) the bearing load, and (iii) a total number of the second voxels;
specify an initial portion of the distribution by specifying application of the force vector for each voxel to nodes of that voxel;
compute a residual force, which is a difference between (i) a total loading value on the surface from the bearing load and (ii) an approximate load on the surface from totaling the force vectors for the second voxels;
place a reference node at a centroid of the individual nodes of the second voxels;
connect the reference node at the centroid to the individual nodes of the second voxels with an interpolation constraint element; and
specify a remaining portion of the distribution as application of the residual force to the reference node to cause distribution of the residual force, during determination of the physical response, through the interpolation constraint element, which constrains motion at the reference node as a weighted average of the individual nodes, thereby ensuring equivalence between the total loading value and a sum of loading values distributed to the individual nodes of the second voxels.

14. The system of claim 8, comprising the one or more computer-controlled manufacturing systems, wherein the threshold distance is half of a size of a voxel in the voxelized mesh, and the instructions cause the one or more data processing apparatus to provide the generatively designed three dimensional shape of the modeled object by causing the one or more data processing apparatus to:

generate toolpath specifications for the one or more computer-controlled manufacturing systems using the three dimensional shape of the modeled object; and manufacture at least a portion of the physical structure, or a mold for the physical structure, with the one or more computer-controlled manufacturing systems using the toolpath specifications.

15. A non-transitory computer-readable medium encoding a program operable to cause one or more data processing apparatus to perform operations comprising:

obtaining a design space for a modeled object, one or more design criteria for the modeled object, and one or more boundary conditions for numerical simulation, wherein the modeled object corresponds to a physical structure, wherein the modeled object comprises a B-Rep solid model of input preserve geometry comprising a surface of the input preserve geometry of the B-Rep solid model, and wherein the one or more boundary conditions comprise a loading condition or a displacement constraint specified in relation to the surface of the input preserve geometry of the B-Rep solid model;

pre-processing a voxelized mesh used to represent the modeled object in the design space, wherein the voxelized mesh comprises first voxels generated by the input preserve geometry having been converted into the voxelized mesh, and the pre-processing comprises identifying second voxels corresponding to the surface, wherein the second voxels are a subset of the first voxels, and the second voxels approximate the surface but do not exactly conform to the surface due to the voxelized mesh being a discretized representation of the input preserve geometry of the B-Rep solid model, identifying individual nodes of the second voxels that each have a respective projected distance to the surface that is less than a threshold distance, wherein the individual nodes are a subset of nodes of the second voxels, and specifying a distribution of the loading condition or the displacement constraint, which has been specified in relation to the surface of the input preserve geometry of the B-Rep solid model, to the second voxels using the individual nodes from the identifying;

iteratively modifying a generatively designed three dimensional shape of the modeled object in the design space in accordance with the one or more design criteria and a physical response of the modeled object determined by the numerical simulation performed by a voxel-based solver using the distribution, which was specified using the individual nodes during the pre-processing before the iteratively modifying begins, to enforce the one or more boundary conditions in the voxelized mesh; and providing the generatively designed three dimensional shape of the modeled object, which is useable in manufacturing the physical structure using one or more computer-controlled manufacturing systems.

16. The non-transitory computer-readable medium of claim 15, wherein the one or more boundary conditions comprise the displacement constraint specified in relation to the surface, the pre-processing comprises finding a single coordinate system local to the surface of the input preserve geometry of the B-Rep solid model, and specifying the distribution comprises applying a single point displacement constraint to each of the individual nodes using the single coordinate system to exactly enforce node displacements in one or more directions during the numerical simulation of the physical response of the modeled object.

17. The non-transitory computer-readable medium of claim 15, wherein the surface is a curved surface, the input preserve geometry comprises an additional surface other than the curved surface, the one or more boundary conditions comprise (i) a zero displacement constraint specified in relation to the additional surface of the input preserve geometry of the B-Rep solid model and (ii) the loading condition comprising a force or moment load specified in relation to the curved surface, and specifying the distribution comprises:

placing a reference node at a centroid of the individual nodes of the second voxels;

connecting the reference node at the centroid to the individual nodes with an interpolation constraint element; and applying the force or moment load to the reference node to cause the distribution of a total loading value of the loading condition, during determination of the physical response, through the interpolation constraint element, which constrains motion at the reference node as a weighted average of the individual nodes, thereby ensuring equivalence between the total loading value and a sum of loading values distributed to the individual nodes of the second voxels.

18. The non-transitory computer-readable medium of claim 15, wherein the surface is a curved surface, the one or more boundary conditions comprise the loading condition comprising a uniform pressure load specified in relation to the curved surface, and specifying the distribution comprises:

computing an area of the curved surface;

finding a normal vector for each of the second voxels;

calculating a force vector for each of the second voxels using the normal vector for that voxel multiplied by the area of the curved surface and the uniform pressure load, which are divided by a total number of the second voxels;

specifying an initial portion of the distribution by specifying application of the force vector for each voxel to nodes of that voxel;

computing a residual force, which is a difference between (i) a total loading value on the curved surface from the uniform pressure load and (ii) an approximate load on the curved surface from totaling the force vectors for the second voxels;

placing a reference node at a centroid of the individual nodes of the second voxels;

connecting the reference node at the centroid to the individual nodes of the second voxels with an interpolation constraint element; and specifying a remaining portion of the distribution as application of the residual force to the reference node to cause distribution of the residual force, during determination of the physical response, through the interpolation constraint element, which constrains motion at the reference node as a weighted average of the individual nodes, thereby ensuring equivalence between the total loading value and a sum of loading values distributed to the individual nodes of the second voxels.

19. The non-transitory computer-readable medium of claim 18, wherein finding the normal vector for each of the second voxels comprises finding eight normal vectors for respective ones of eight vertices of each of the second voxels, calculating the force vector for each of the second voxels comprises calculating eight force vectors for the respective ones of eight vertices of each of the second voxels using the respective normal vector for the vertex of that voxel multiplied by the area of the curved surface and the uniform pressure load, which are divided by eight and by the total number of the second voxels, and specifying the initial portion of the distribution comprises specifying application of each of the eight force vectors to respective ones of the eight vertices of each of the second voxels.

20. The non-transitory computer-readable medium of claim 15, wherein the one or more boundary conditions comprise the loading condition comprising a bearing load having a bearing coordinate system specified in relation to the surface, and specifying the distribution comprises:

finding a bearing angle for each of the second voxels, wherein the bearing angle is with respect to an axis of the bearing coordinate system;

calculating a force vector for each of the second voxels using (i) the bearing angles found for the second voxels, (ii) the bearing load, and (iii) a total number of the second voxels;

specifying an initial portion of the distribution by specifying application of the force vector for each voxel to nodes of that voxel;

computing a residual force, which is a difference between (i) a total loading value on the surface from the bearing load and (ii) an approximate load on the surface from totaling the force vectors for the second voxels;

placing a reference node at a centroid of the individual nodes of the second voxels;

connecting the reference node at the centroid to the individual nodes of the second voxels with an interpolation constraint element; and specifying a remaining portion of the distribution as application of the residual force to the reference node to cause distribution of the residual force, during determination of the physical response, through the interpolation constraint element, which constrains motion at the reference node as a weighted average of the individual nodes, thereby ensuring equivalence between the total loading value and a sum of loading values distributed to the individual nodes of the second voxels.

21. The non-transitory computer-readable medium of claim 15, wherein the threshold distance is half of a size of a voxel in the voxelized mesh, and the providing comprises:

generating toolpath specifications for a manufacturing machine using the three dimensional shape of the modeled object; and manufacturing at least a portion of the physical structure, or a mold for the physical structure, with the manufacturing machine using the toolpath specifications.

* * * * *